(12) United States Patent
Takagi et al.

(10) Patent No.: US 7,324,440 B2
(45) Date of Patent: Jan. 29, 2008

(54) MULTIRING CONTROL METHOD, NODE USING THE METHOD, AND CONTROL PROGRAM

(75) Inventors: Kazuo Takagi, Tokyo (JP); Masaki Umayabashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1052 days.

(21) Appl. No.: 10/359,133

(22) Filed: Feb. 6, 2003

(65) Prior Publication Data

US 2003/0147345 A1    Aug. 7, 2003

(30) Foreign Application Priority Data

Feb. 6, 2002 (JP) ............... 2002-028900

(51) Int. Cl.
*H04J 1/16* (2006.01)
*H04J 3/14* (2006.01)

(52) U.S. Cl. ........................ 370/222; 370/221
(58) Field of Classification Search ................ 370/216, 370/221, 222, 223, 224; 714/1, 2
See application file for complete search history.

(56) References Cited

U.S. PATENT DOCUMENTS 6,147,970 A * 11/2000 Troxel .................. 370/235

6,185,210 B1 * 2/2001 Troxel .................. 370/395.32

FOREIGN PATENT DOCUMENTS

| JP | 07-264223 | 10/1995 |
|----|-----------|---------|
| JP | 2000-004248 | 1/2000 |
| JP | 2002-319973 | 10/2002 |

OTHER PUBLICATIONS

D. Tsiang et al., RFC 2892 The Cisco SRP Mac Layer Protocol, Aug. 2000.

* cited by examiner

*Primary Examiner*—Ajit Patel
(74) *Attorney, Agent, or Firm*—Young & Thompson

(57) ABSTRACT

The invention enables protection of a ring frame transferred via an inter-ring bridge ring node when a fault occurs at the node in a multiring. Ring nodes form a ring protection domain to enable one ring node to be bypassed by using other ring nodes when a fault occurs at this ring node. The TTL value of ring frame to be transferred through the bypass is set to a value obtained by adding the number of hops h to the faulty ring node to a common initial value A in the same two-fiber ring to enable detection of a characteristic TTL value at a bypassing ring node. The bypass fur the ring frame is selected with reference to the characteristic TTL value at the bypassing ring node.

39 Claims, 19 Drawing Sheets

MULTIRING CONFIGURATION

OCCURRENCE OF FAULT AT RING NODE 720-2

PROTECTION

RING FRAME CONFIGURATION

UNICAST FRAME TRANSFER

MULTICAST / BROADCAST FRAME TRANSFER

BEFORE OCCURRENCE OF FAULT

WRAP PROTECTION

MULTIRING CONTROL METHOD, NODE USING THE METHOD, AND CONTROL PROGRAM

BACKGROUND OF THE INVENTION

1. Field of the Invention

The present invention relates to a multiring control method, a node using the method, and a control program. More particularly, the present invention relates to a method of discarding a ring frame in a multiring and a protection method.

2. Description of the Prior Art

With the increase in traffic of data typified by Internet protocols (IP), a demand for efficient data transmission has arisen even on conventional communication service companies which have mainly offered voice transmission service (hereinafter referred to as "carrier"). Also in the field of data transmission networks, there is a demand for a highly reliable protection method such as one conformable to "SONET, GR-1230-Core, Issue 3 Dec. 1996 Bellcore" on which conventional transmission networks are based. Spatial Reuse Protocol (hereinafter referred to as SRP) (RFC 2892 IETF) can be mentioned as a highly reliable protection method for data transmission networks.

A conventional protection method using SRP will be described with reference to FIGS. 14 to 19. FIG. 15 is a diagram showing a simplified configuration of a ring frame (also referred to as "network node interface (NNI) packet") 180 used between ring nodes. The ring frame 180 has a transmission destination ring node address 181, a transmission source ring node address 182, a transmission ring ID 183, a time to live (TTL) 184, a frame attribute 185, a flow ID 186, and a user frame 187. A ring node address for a transmission destination is stored as transmission destination ring node address 181. A ring node address for a transmission source is stored as transmission source ring node address 182. An identifier for a ring frame transmission ring, i.e., an inner ring or an outer ring, is stored as transmission ring ID 183. The maximum number of hops that the frame can make in a two-fiber ring is stored as TTL 184. An attribute of the ring frame 180 is stored as frame attribute 185. As ring frame attribute 185, attributes "fault information notice frame" and "data frame" are defined. An ID for identification of a flow is stored as flow ID 186.

FIG. 14 is a diagram showing the configuration of a ring node 100 which is an example of a conventional ring node. Referring to FIG. 14, the ring node 100 is constituted by address comparators 110 and 111, forwarding circuits 120 and 121, multiplexing circuits 130 and 131, a ring protection processing circuit 140, a protection switch 150, a packet switch 160, and a frame conversion circuit 170.

A user frame input through a tributary link 103-in is transferred to the frame conversion circuit 170.

The frame conversion circuit 170 converts the user frame into a ring frame 180. The frame conversion circuit 170 identifies a transmission destination ring node from the transmission destination address in the user frame, stores the address as transmission destination ring node address 181 in the ring frame 180, stores the address of this node as transmission source ring node address 181, and stores various parameters as transmission ring ID 183, TTL 184, frame attribute 185, and flow ID 186. Thereafter, the frame conversion circuit 170 transfers the ring frame 180 to the packet switch 160. The frame conversion circuit 170 also converts a ring frame 180 transferred from the packet switch 160 into a user frame and outputs the user frame through the tributary 103-out.

The packet switch 160 receiving the ring frame 180 from the frame conversion circuit 170 transfers the ring frame 180 to the suitable multiplexing circuit 130 or 131 by referring to the transmission destination ring node address 181 in the ring frame 180. The packet switch 160 also receives a ring frame 180 transferred from the forwarding circuit 120 or 121 and transfers this ring frame 180 to the frame conversion circuit 170.

A ring frame 180 from an inner ring 101-in or an outer ring 102-in is input to the address comparator 110 or 111.

The address comparator 110 or 111 discards the received ring frame 180 in a case where the transmission source ring node address 181 in the ring frame 180 and the address of this node coincide with each other, and where the transmission ring ID 183 and the ID of the ring from which the ring frame 180 has been received coincide with each other. In other cases, the address comparator transfers the ring frame 180 to the forwarding circuit 120 or 121.

The forwarding circuit 120 or 121 transfers the received ring frame 180 to the ring protection processing circuit 140 if the transmission destination ring node address 181 in the ring frame 180 is the same as the address of this node and if the frame attribute 185 is "fault information frame". The forwarding circuit also transfers the received ring frame 180 to the packet switch 160 if the transmission destination ring node address 181 in the ring frame 180 is the same as the address of this node and if the frame attribute 185 is "user frame".

Also, the forwarding circuit 120 or 121 makes copies of the ring frame 180 and transfers one of the copies to the packet switch 160 if the transmission destination ring node address 181 coincides with the address of multicasting/broadcasting in which this node participates. The forwarding circuit 120 or 121 subtracts 1 from the TTL value if the transmission destination ring node address 181 in the input ring frame 180 does not coincide with the address of this node, or if the transmission destination ring node address 181 is a multicast/broadcast address. The forwarding circuit 120 or 121 discards ring frame 180 in which the TTL value is zero and transfers other ring frames 180 to the protection switch 150.

The protection switch 150 has a pass mode and a wrap mode. In the pass mode, it transfers a ring frame 180 from the forwarding circuit 120 to the multiplexing circuit 130 or transfers a ring frame 180 from the forwarding circuit 121 to the multiplexing circuit 131. In the wrap mode, it transfers a ring frame 180 from the forwarding circuit 120 to the multiplexing circuit 131 or transfers a ring frame 180 from the forwarding circuit 121 to the multiplexing circuit 130. The mode of the protection switch 150 is changed by the ring protection processing circuit 140.

The ring protection processing circuit 140 monitors the condition of junction links to adjacent nodes. If a fault occurs in the junction links, the ring protection processing circuit 140 changes the mode of the protection switch 150 from the pass-through mode to the wrap mode and transfers a ring frame 180 containing information on the faulty condition to the multiplexing circuits 130 and 131. At this time, frame at tribute 185 of the ring frame 180 is "fault notice frame", the address of this node is assigned as transmission source ring node address 181, and the corresponding adjacent ring node address is stored as transmission destination ring node address 181.

If the ring protection processing circuit 140 receives through the forwarding circuit 120 or 121 a ring frame 180 containing information on a fault from one adjacent ring node 100, it transfers the ring frame 180 containing the information to the multiplexing circuit 130 or 131 in order to transfer the ring frame 180 to the other adjacent ring node 100 in the same ring from which the ring frame 180 has been received. At this time, the address of this node is stored as transmission source ring node address 181 in the ring frame 180.

Each of the multiplexing circuits 130 and 131 multiplexes ring frames 180 from the packet switch 160, the protection switch 150 and the ring protection processing circuit 140 and transfers the multiplexed ring frames to the inner ring 101-in or outer ring 102-out.

FIGS. 16 and 17 show a two-fiber-ring network formed of eight ring nodes 100. It is assumed here that the inner ring 101 transfers ring frames 180 clockwise and the outer ring 102 transfers ring frames 180 counterclockwise.

A case of transfer of a unicast user frame from a terminal 210 to a terminal 211 in the ring network will be described with reference to FIG. 16.

When a ring node 100-7 receives a user frame from terminal 210, it forms a ring frame 180 by setting "ring node 100-4" as transmission destination ring node address 181, "ring node 100-7" as transmission source ring node address 182, "outer ring" as ring ID 183, and designated values as TTL 184, frame attribute 185 and flow ID 186, and transfers this ring frame 180 through the outer ring 102. The ring frame 180 transferred to the outer ring 102 is transferred to the ring node 100-4 via a route 201 including ring nodes 100-6 and 100-5. In each of the ring nodes 100-6 and 100-5, 1 is subtracted from the TTL in the ring frame 180. The ring node 100-4 converts the transferred ring frame 180 into a user frame and transfers this user frame to the terminal 211.

A case of transfer of a multicast/broadcast user frame from the terminal 210 to the terminal 211 will be described with reference to FIG. 17.

When the ring node 100-7 receives a user frame from terminal 210, it forms a ring frame 180 by setting "multicast/broadcast address" as transmission destination ring node address 181, "ring node 100-7" as transmission source ring node address 182, "outer ring" as ring ID 183, and designated values as TTL 184, frame attribute 185 and flow ID 186, and transfers this ring frame 180 to the outer ring 102. The ring frame 180 transferred to the outer ring 102 is transferred to the ring node 100-7 via a route 202 including the ring nodes 100-6, 100-5, 100-4, 100-3, 100-2, 100-1, and 100-8. In each of the ring nodes 100-6, 100-5, 100-4, 1003, 100-2, 100-1, and 100-8, copies of the ring frame 180 are made: one copy being converted into a user frame and transmitted to a suitable terminal; and another copy being transferred to the adjacent ring node while 1 is subtracted from the TTL 184. The ring node 100-7 discards the ring frame 180 since the transmission source ring node address 181 in the ring frame 180 and the transmission ring ID 183 coincide with the address of this node and the outer ring through which the ring frame 180 has been received.

FIGS. 18 and 19 show protection in a case where a fault occurs in the inner ring 101 or the outer ring 102 between the ring nodes 100-5 and 100-6 when a ring frame 180 is transferred from the ring node 100-7 to the ring node 100-4 via a route 301 by using the inner ring 101. The configuration of the network shown in FIGS. 18 and 19 is the same as that shown in FIGS. 16 and 17.

The ring protection processing circuit 140 in each of the ring nodes 100-5 and 100-6 detects the fault and sets the protection switch 150 of the node in the wrap mode to transfer the ring frame 180 as described below. The ring frame 180 to be transferred from the ring node 100-7 to the ring node 100-4 is transferred to the ring node 100-6 through the outer ring 102 and sent back from the ring node 100-6 by being transferred through the inner ring 101. The returned ring frame 180 is transferred to the ring node 100-5 via the ring nodes 100-7, 100-8, and 100-1 to 100-4. The ring frame 180 is again sent back from the ring node 100-5 by means of the outer ring 102 to be transferred to the ring node 100-4 via a route 302.

Thus, the conventional ring network using SRP has a loop configuration but can avoid looping of a ring frame input to the network by discarding the ring frame when the ring frame reaches the transmission source ring node or when the TTL value becomes zero. Also, in the case of occurrence of a fault in the ring, the faulty-end ring nodes reverse the ring frame transfer direction to ensure high-speed protection.

In a case where multiple rings are connected as an expansion of the single two-fiber ring, when a broadcast/multicast frame flows into the two-fiber ring operating as a relay ring, it cannot be discarded unless the TTL counter becomes zero, since no ring node having the transmission source ring node address exists in the ring, as long as discarding is based on the conventional principle. There is a possibility of the ring frame making one round or more of the relay ring, depending on the initial setting of the TTL counter, that is, the same ring frame may be transmitted two or more times to the ring node which is to receive the ring frame, resulting in a reduction in network efficiency.

If, in a similar network, a fault occurs at one of inter-ring bridge nodes connected between a plurality of rings when a ring frame is being transferred to the transmission destination ring node via some of the plurality of rings and the inter-ring bridge node, protection cannot be effected in the system even if a usable physical path exits. This is because another of the inter-ring bridge nodes capable of providing a bypass route cannot recognize the ring frame for which bridging has been performed by the faulty inter-ring bridge node.

BRIEF SUMMARY OF THE INVENTION

In view of the above-described problem of the conventional art, an object of the present invention is to provide a multiring control method which ensures that a broadcast/multicast frame transferred over rings in a multiring network can be efficiently discarded in a relay ring, and which also ensures protection even when a fault occurs at an inter-ring bridge node, a node using the method, and a program for control based on the method.

To achieve the above-described object, according to one aspect of the present invention, there is provided a method of controlling a multi-two-media ring network in which a plurality of two-media ring networks using ring nodes capable of transferring a network node interface (NNI) packet by using an inner ring or an outer ring and transferring the NNI packet to a desired network or terminal are connected, the method including a TTL value updating step of updating a time to live (TTL) value in the NNI packet when the NNI packet is transferred from one of the two-media ring networks to another of the two-media ring networks, and an NNI packet processing step of comparing the updated TTL value and a predetermined TTL discard value and discarding the NNI packet or transferring the NNI packet to an adjacent ring node according to the result of comparison.

According to another aspect of the present invention, there is provided a method of controlling a multi-two-media ring network in which a plurality of two-media ring networks constituted by ring nodes R1 capable of transmitting and receiving an NNI packet by using an inner ring or an outer ring and performing transmitting and receiving of the NNI packet with a terminal through a port are connected by ring nodes R2 which bridge the two-media ring networks, the method including forming a ring protection domain of a plurality of the ring nodes R2 bridging the two-media ring networks, and a protection execution step of transferring the NNI packet via a bypass when a fault occurs at one of the plurality of ring nodes R2, the bypass being formed by at least another of the ring nodes R2 other than the ring node R2 at which the fault has occurred.

According to still another aspect of the present invention, there is provided a ring node connected between a plurality of two-media ring networks using the ring node capable of transferring an NNI packet by using an inner ring or an outer ring and transferring the NNI packet to a desired network or terminal are connected, the ring node having TTL value updating means of updating a TTL value in the NNI packet when the NNI packet is transferred from one of the two-media ring networks to another of the two-media ring networks, and NNI packet processing means of comparing the updated TTL value and a predetermined TTL discard value and discarding the NNI packet or transferring the NNI packet to an adjacent ring node according to the result of comparison.

According to a further aspect of the present invention, there is provided a ring node R1 in a multi-two-media ring network in which a plurality of two-media ring networks constituted by the ring node R1 capable of transmitting and receiving an NNI packet by using an inner ring or an outer ring and performing transmitting and receiving of the NNI packet with a terminal through a port are connected by ring nodes R2 which bridge the two-media ring networks, a ring protection domain being formed by a plurality of the ring nodes R2 bridging the two-media ring networks, the ring node R1 having fault information notice means of notifying fault information to the other ring nodes R1 in the same two-media ring network if a fault occurs at an adjacent one of the ring nodes R2, send-back transfer means of sending back the transferred NNI packet in transfer of the NNI packet, and NNI packet transmitting means of updating the TTL value on the basis of fault information from the other ring nodes R1 if the ring node R1 is a transmission source ring node R1, the NNI packet transmitting means transmitting the NNI packet from the same two-media ring network as before the occurrence of the fault to one of the ring nodes R2 other than the ring node R2 at which the fault has occurred.

According to still a further aspect of the present invention, there is provided a ring node R2 in a multi-two-media ring network in which a plurality of two-media ring networks constituted by ring nodes R1 capable of transmitting and receiving an NNI packet by using an inner ring or an outer ring and performing transmitting and receiving of the NNI packet with a terminal through a port are connected by the ring node R2 bridging the two-media ring networks, a ring protection domain being formed by a plurality of the ring nodes R2 bridging the two-media ring networks, the ring node R2 comprising first transport means of receiving the NNI packet which is transmitted from a transmission source ring node R1 in the two-media ring network containing one of the ring nodes R2 at which a fault has occurred, and in which the TTL value is updated, and transmitting the NNI packet to the another of the two-media ring networks while updating the TTL value of the another of the two-media ring networks to which the ring node R2 is connected, and second transport means of receiving the NNI packet transferred from the first transport means, recognizing the NNI packet as a packet transferred via a bypass from the TTL value in the NNI packet, and transferring the NNI packet to still another of the two-media ring networks.

According to still a further aspect of the present invention, there is provided a program for making a computer execute a method of controlling a multi-two-media ring network in which a plurality of two-media ring networks using ring nodes capable of transferring a network node interface (NNI) packet by using an inner ring or an outer ring and transferring the NNI packet to a desired network or terminal are connected, the program including a TTL value updating step of updating a time to live (TTL) value in the NNI packet when the NNI packet is transferred from one of the two-media ring networks to another of the two-media ring networks, and an NNI packet processing step of comparing the updated TTL value and a predetermined TTL discard value and discarding the NNI packet or transferring the NNI packet to an adjacent ring node according to the result of comparison.

According to the present invention, the above-described arrangement ensures that a broadcast/multicast frame to be transferred over rings can be efficiently discarded in a relay ring, and that protection even from a fault at an inter-ring bridge can be effected.

DETAILED DESCRIPTION OF THE PREFERRED EMBODIMENTS

Embodiments of the present invention will be described with reference to the accompanying drawings.

First Embodiment

Figure 12:
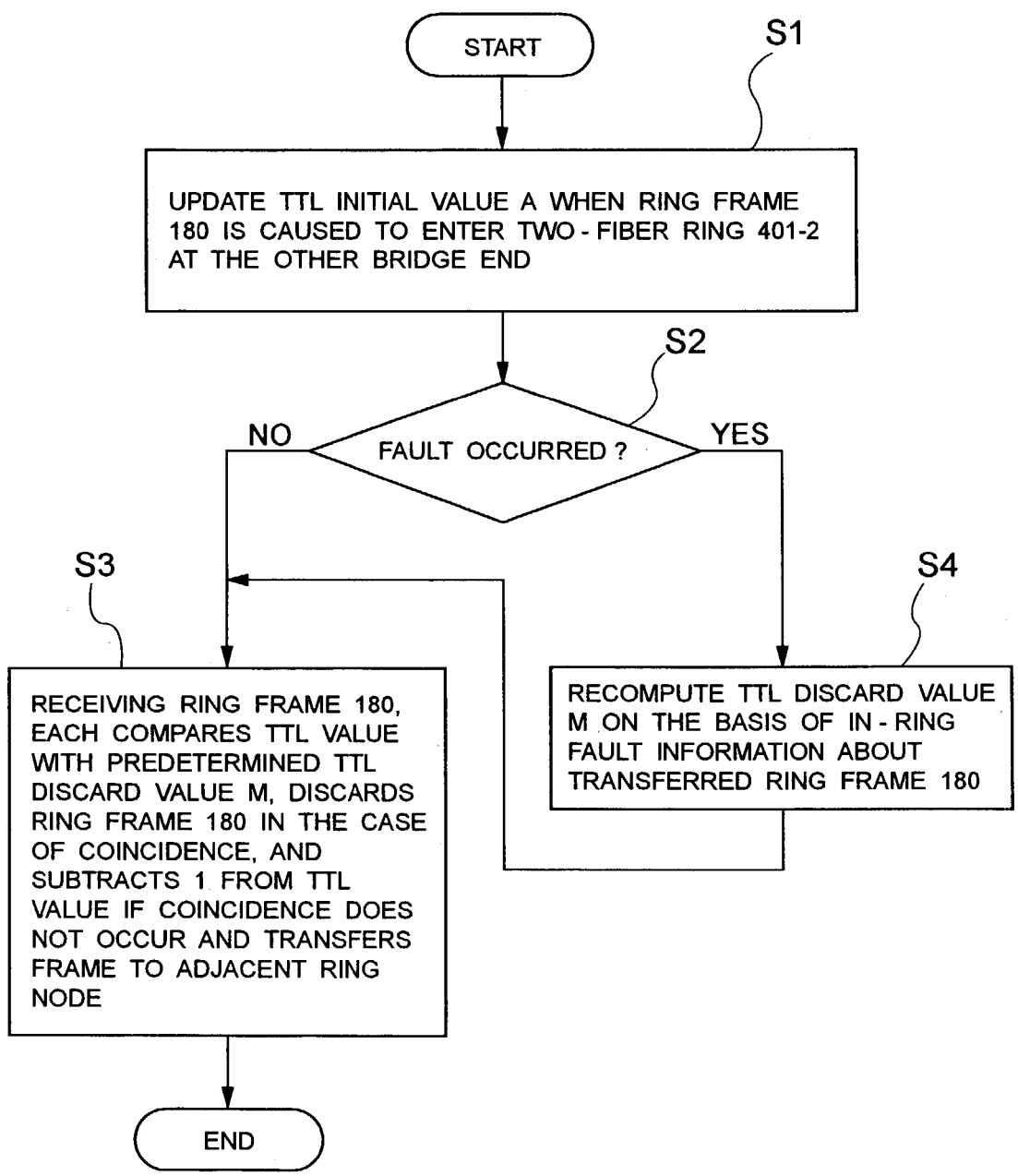
FIG. 12 is a flowchart showing the operation of the first embodiment of the invention.

A first method for efficient discard of a ring frame in a relay ring will be described with reference to FIGS. 1 and 2 and also to the flowchart of FIG. 12 showing the operation of the first embodiment.

Figure 1:
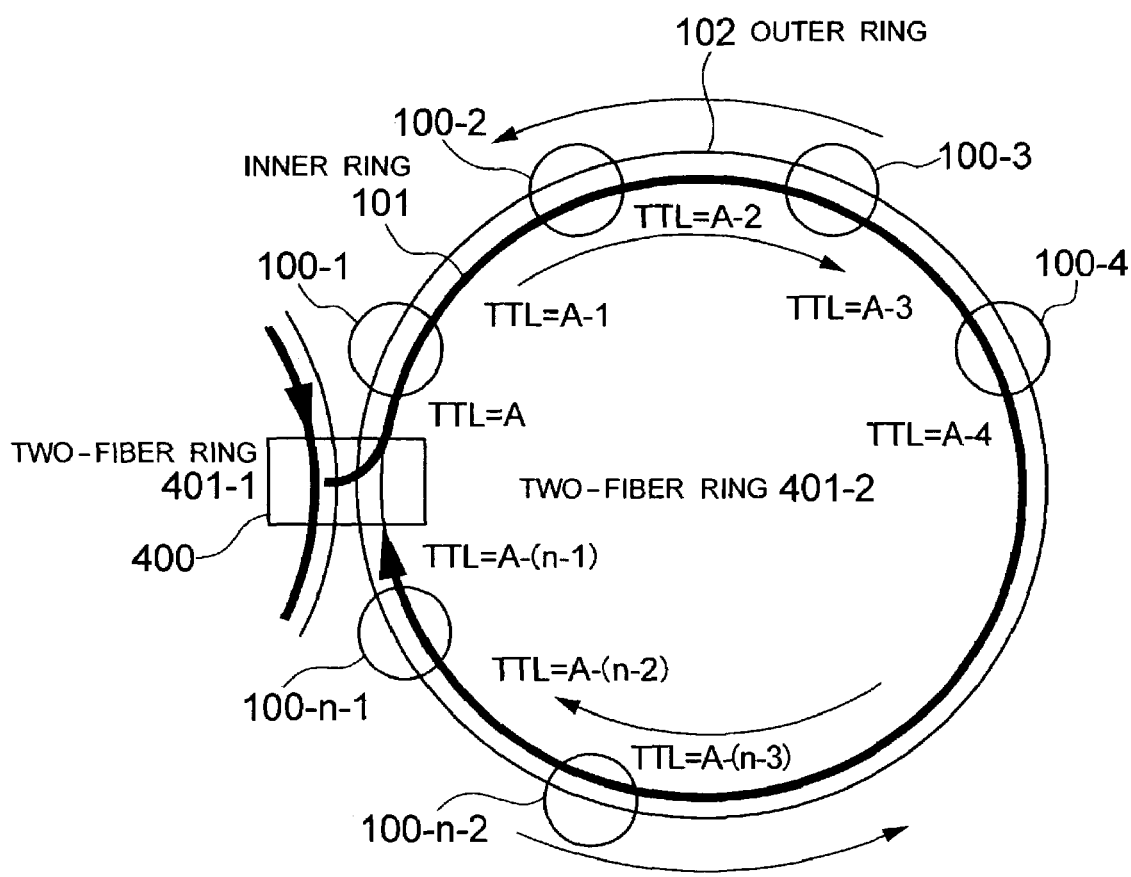
FIG. 1 is a diagram showing the operation of a first embodiment of the invention.
Figure 2:
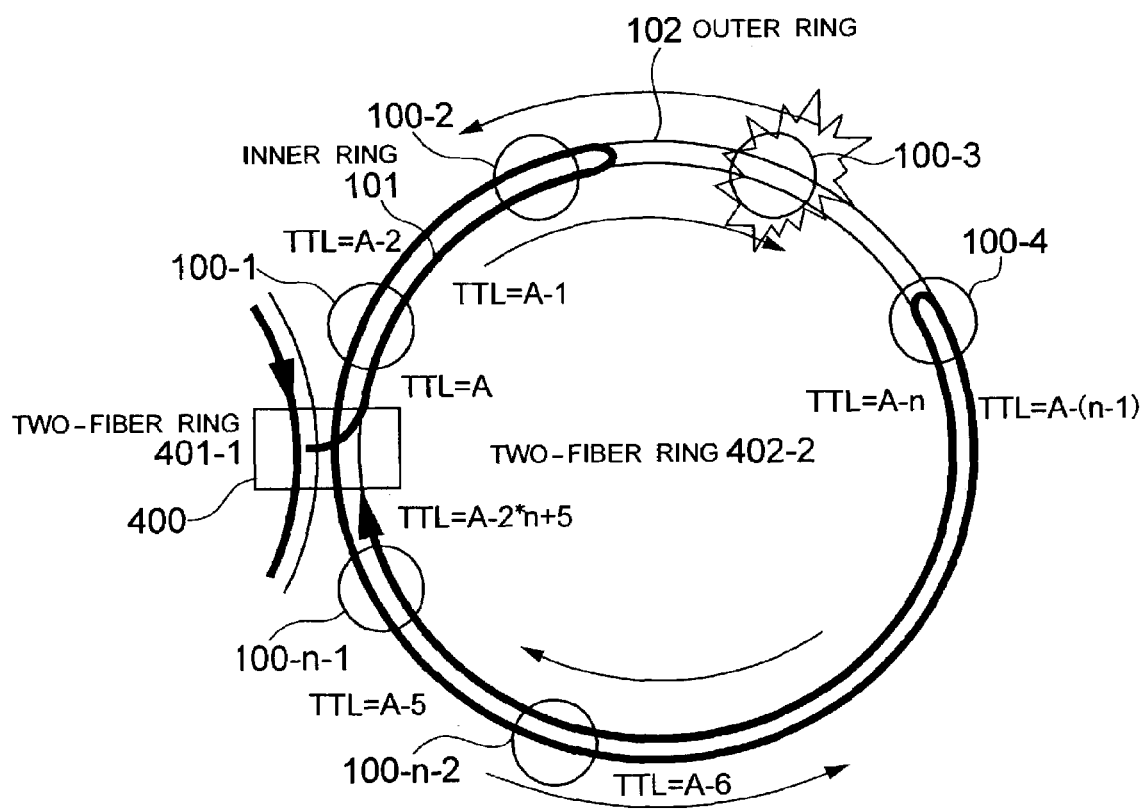
FIG. 2 is a diagram showing the operation of the first embodiment of the invention.

FIG. 1 shows a multiring configuration in which two-fiber rings 401-1 and 401-2 each formed of ring nodes 100 are bridged by a ring node 400. In the two-fiber ring 401-2, a total of n number of ring nodes 100 and 400 are connected.

The ring node 400 is given in advance the addresses of the ring nodes 100 and 400 and the total number n on the two-fiber rings 401-2 bridged by it. Description will be made by assuming that a ring frame transmitted in an inner ring 101 and an outer ring 102 between the ring nodes 100 and 400 is the same as the ring frame 180 shown in FIG. 13. However, it is not necessarily required that the ring frame transmitted through these rings have the same configuration as the ring frame 180, and the ring frame in this embodiment may have at least the information fields of the ring frame 180. The two-fiber ring 401-2 has a predetermined TTL initial value A. Each of the ring nodes 100 and 400 sets the TTL initial value A in TTL 184 in a ring frame 180 (S1 of FIG. 12) when the ring frame 180 is caused to flow into the two-fiber ring 401-2. The ring node 400 has the function of subtracting 1 from the TTL value when it passes through itself a ring frame 180 received from the two-fiber ring 401-1 or 401-2.

A ring frame 180 entering the two-fiber ring 401-2 from the two-fiber ring 401-1 through the ring node 400 bridging these rings is transferred in the inner ring 101 or the outer ring 102, with the TTL 184 set to the TTL initial value A. A TTL discard value M is set in the ring node 400. The ring node 400 discards the ring frame 180 received from the two-fiber ring 401-2 if the TTL 184 and the TTL discard value M coincide with each other. The TTL discard value M is determined as a TTL value which is detected when a ring frame 180 caused to flow into the two-fiber ring 401-2 through this ring node is received from the same ring as the inner ring 101 or the outer ring 102 into which the ring frame 180 is caused to flow.

In a situation where no fault occurs (in the case of NO in S2 of FIG. 12), M=A−n+1 if the ring node 400 does not perform subtraction from TTL 184 when transmitting a ring frame 180 to a different two-fiber ring, and refers to the TTL 184 before subtraction processing on the TTL 184 in the ring frame 180 from the inner ring 101 or the outer ring 102. Also, M=A−n if the ring node 400 does not perform subtraction from TTL 184 when transmitting a ring frame 180 to a different two-fiber ring, and refers to the TTL 184 after subtraction processing on the TTL 184 in the ring frame 180 from the inner ring 101 or the outer ring 102 (S3 of FIG. 12).

The method for efficient discard of a ring frame in the case of occurrence of a fault at the ring node 100-3 of the two-fiber ring 401-2 (the case of YES in S2 of FIG. 12) will be described with reference to FIG. 2.

Each of the ring nodes 100-2 and 100-4 detecting the fault transfers a ring frame 180 containing in-ring fault information to the outer ring 102 or the inner ring 101. This ring frame 180 is transferred to all the ring nodes 100 and 400 in the two-fiber ring 401-2. The ring node 400 measures the numbers of hops h1 and h2 to the transmission source ring nodes 100-2 and 100-4 from the in-ring fault information in the transferred ring frame 180, computes the total number of ring nodes 100 and 400 after protection from the sum (h1+h2) of the numbers of hops, and recomputes the TTL discard value M to be detected when a ring frame 180 sent out from itself makes one round of the two-fiber ring 401-2 after protection (S4 of FIG. 12).

For example, the TTL discard value M is A−2*(h1+h2)+1 if the ring node 400 does not perform subtraction from TTL 184 when transmitting a ring frame 180 to a different two-fiber ring by bridging, and refers to the TTL 184 before subtraction processing on the TTL 184 in the ring frame 180 from the inner ring 101 or the outer ring 102. In this embodiment, since h1=2 and h2=n−4, the TTL discard value M is A−2*n+5. Also, the TTL discard value M is A−2*(h1+h2) if the ring node 400 does not perform subtraction from TTL 184 when transmitting a ring frame 180 to a different two-fiber ring by bridging, and refers to the TTL 184 after subtraction processing on the TTL 184 in the ring frame 180 from the inner ring 101 or the outer ring 102. In this embodiment, since h1=2 and h2=n−4, the TTL discard value M is A−2*n+4.

Thus, in the first embodiment, a ring frame sent out from a bridging ring node can be discarded by the ring-node after making one round of the two-fiber ring at the maximum irrespective of the existence/nonexistence of a fault.

Embodiment 2

A ring node configuration for inter-ring bridging for realization of the first method for efficient discard of a ring frame will be described with reference to FIG. 3.

Figure 3:
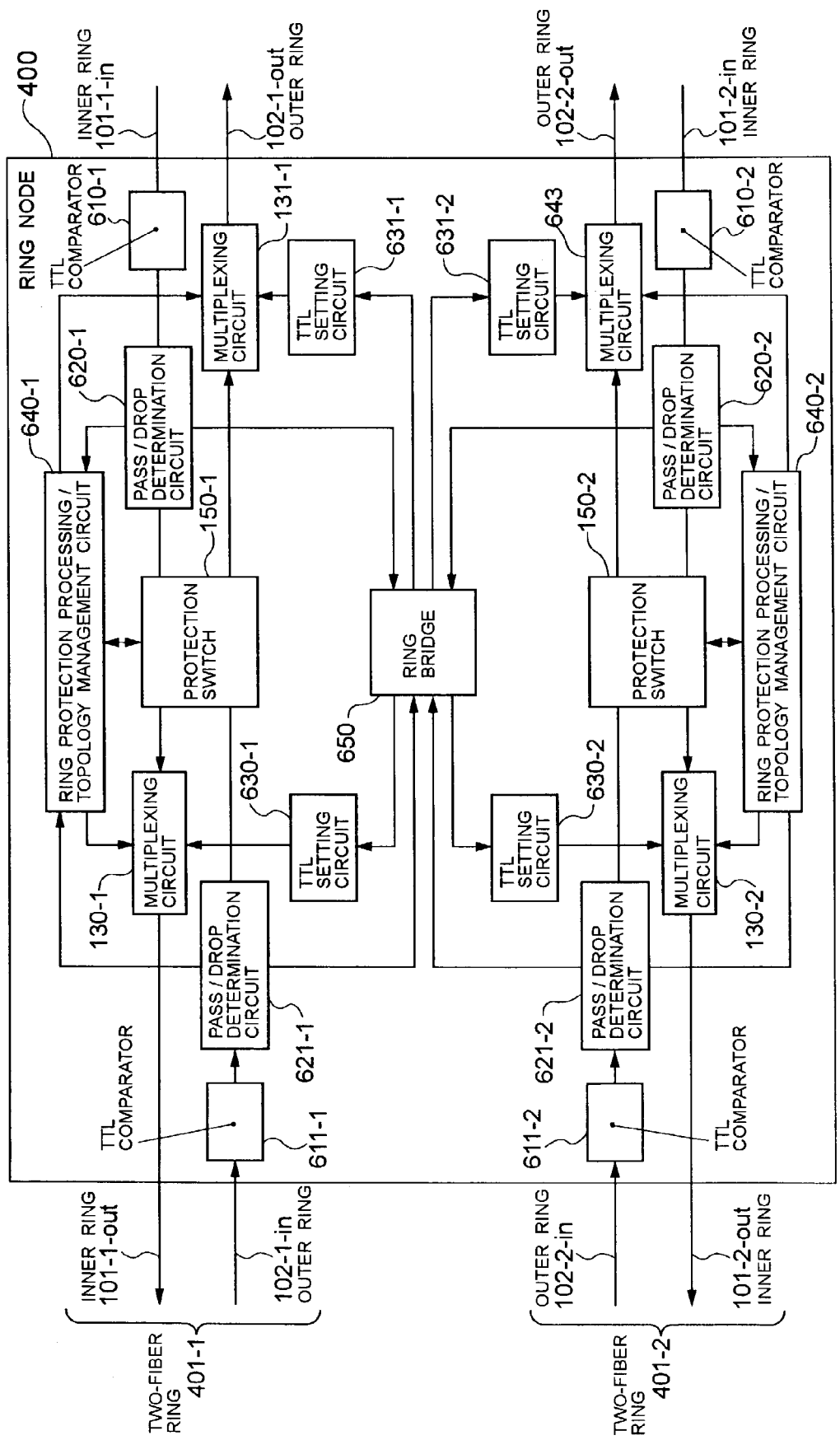
FIG. 3 is a diagram showing the configuration of a second embodiment of the invention.

FIG. 3 shows the configuration of the ring node 400 bridging the two-fiber rings 401-1 and 401-2 shown in FIG. 1.

The configuration of the ring node 400 is symmetrical about a ring bridge 650. In FIG. 1, functional blocks corresponding to each other in the symmetrical configuration are indicated by symbols such as x-1 and x-2 (x: functional block number). For ease of description, indication with "-1" and "-2" is omitted in the following description.

The ring node 400 is constituted by multiplexing circuits 130 and 131, protection switches 150, TTL comparators 610 and 611, pass/drop determination circuits 620 and 621, TTL setting circuits 630 and 631, ring protection processing/topology management circuits 640, and the ring bridge 650. The inner ring 101-1 and the outer ring 102-1 belong to the same two-fiber ring 401-1, while the inner ring 101-2 and the outer ring 102-2 belong to the same two-fiber ring 401-2. The inner rings 101-1 and 101-2 are collectively referred to as "inner ring 101" unless they are specially discriminated. Also, the outer rings 102-1 and 102-2 are collectively referred to as "outer ring 102". The functions of the multiplexing circuits 130 and 131 and the protection switches 150 are the same as those of the corresponding components of the above-described conventional node. However, different blocks having functions relating to connection of these functional blocks are provided. The same input/output information is used in spite of the existence of the different connection functional blocks for the functional blocks.

A ring frame 180 input from the inner ring 101-in or the outer ring 102-in is input to the TTL comparator 610 or 611.

The TTL comparator 610 or 611 discards a received ring frame 180 if the TTL 184 in the received ring frame 180 coincides with the TTL discard value M notified from the ring protection processing/topology management circuit 640. In other cases, the TTL comparator transfers the ring frame 180 to the pass/drop determination circuit 620 or 621.

The pass/drop determination circuit 620 or 621 transfers to the ring protection processing/topology management circuit 640 a ring frame 180 in which the transmission destination ring node address 181 designates this ring node, and in which the frame attribute 185 has an identifier for a fault information notice. Also, the pass/drop determination circuit 620 or 621 transfers to the ring bridge 650 a ring frame 180 in which the transmission destination ring node address 181 is an address requiring ring bridging. The pass/drop determination circuit 620 or 621 performs subtraction processing on the TTL 184 in each of other ring frames 180, discards the ring frame 180 if the result of subtraction is 0, and transfers the ring frame 180 to the protection switch 150 if the subtraction result value is a value other than 0.

The protection switch 150 transfers a ring frame 180 from the pass/drop determination circuit 620 to the multiplexing circuit 130 and a ring frame 180 from the pass/drop determination circuit 621 to the multiplexing circuit 131 in the pass mode. The protection switch 150 transfers a ring frame 180 from the pass/drop determination circuit 620 to the multiplexing circuit 131 and a ring frame 180 from the pass/drop determination circuit 621 to the multiplexing circuit 130 in the wrap mode. The mode of the protection switch 150 is changed by the ring protection processing/topology management circuit 640.

The ring bridge 650 transfers an input ring frame 180 to the desired one of the TTL setting circuits 630 and 631.

Each of the TTL setting circuits 630 and 631 writes the TTL initial value A notified from the ring protection processing/topology management circuit 640 to the TTL 184 in the ring frame 180. Strictly speaking, this TTL initial value A may vary between the set of the TTL setting circuits 630-1 and 631-1 and the set of the TTL setting circuits 630-2 and 631-2 because it is set with respect to each two-fiber ring. In this description, however, it is expressed as TTL initial value A, as is that in the first embodiment of the present invention.

The ring protection processing/topology management circuit 640 is prepared in correspondence with each two-fiber ring 401, and monitors a ring fault condition with respect to each two-fiber ring 401. When a fault occurs, the ring protection processing/topology management circuit 640 changes the mode of the protection switch 150 from the through mode to the wrap mode, forms fault information including the address of this node in which the fault has been detected, and transfers a ring frame 180 in which the address of this node is set as transmission source ring node address 181 to the adjacent ring node 100 or 400 on the two-fiber ring 401 in which the fault has occurred. In a case where fault information is received from the adjacent ring node 100 or 400, the ring protection processing/topology management circuit 640 transfers the information to the adjacent ring node 100 or 400 through the same link through which the information has been received.

Also, the ring protection processing/topology management circuit 640 has information on the layout of the nodes of the management monitoring-object two-fiber ring 401, and determines the TTL initial value A and the TTL discard value M on the basis of the number n of ring nodes existing in the ring. The ring protection processing/topology management circuit 640 notifies the TTL setting circuits 630 and 631 of the TTL initial value A common to the ring nodes for bridging on the management/monitoring-object two-fiber rings 401, and notifies the TTL comparators 610 and 611 of the TTL discard value M. The TTL discard value M is determined as a value which can be measured if a ring frame 180 having the TTL initial value A is transferred from the inner ring 101 or the outer ring 102 in one two-fiber ring 401 and is received from the same ring as the transmission ring. In an ordinary state, therefore, the TTL discard value M is A−(n−1).

In the event that a fault occurs, and that fault information is received from both the inner ring 101 and the outer ring 102 in one two-fiber ring, the TTL discard value M is A−2*(h1+h2)+1 if h1 is the number of hops to the fault detecting ring node notified from the inner ring 101, h2 is the number of hops to the fault detecting ring node notified from the outer ring 102. If fault information is received from one of the inner ring 101 and the outer ring 102, the TTL discard value M is A−2*n+3.

Use of the above-described ring node configuration enables realization of the first method for efficient discard of a ring frame in a relay ring in accordance with the present invention.

It is desirable that the TTL initial value A set by the ring protection processing/topology management circuit 640 be a TTL value of −1 or greater in a case where, when a single ling fault occurs in one two-fiber ring 401, a ring frame 180 is transferred by using one of the inner ring 101 or the outer ring 102 of the ring node of the two-fiber ring, and is received by the same ring as the transmission ring. For example, if n ring nodes exist in one two-fiber ring, the TTL initial value A may be set to a value equal to or greater than 2n−3.

Third Embodiment

Figure 13:
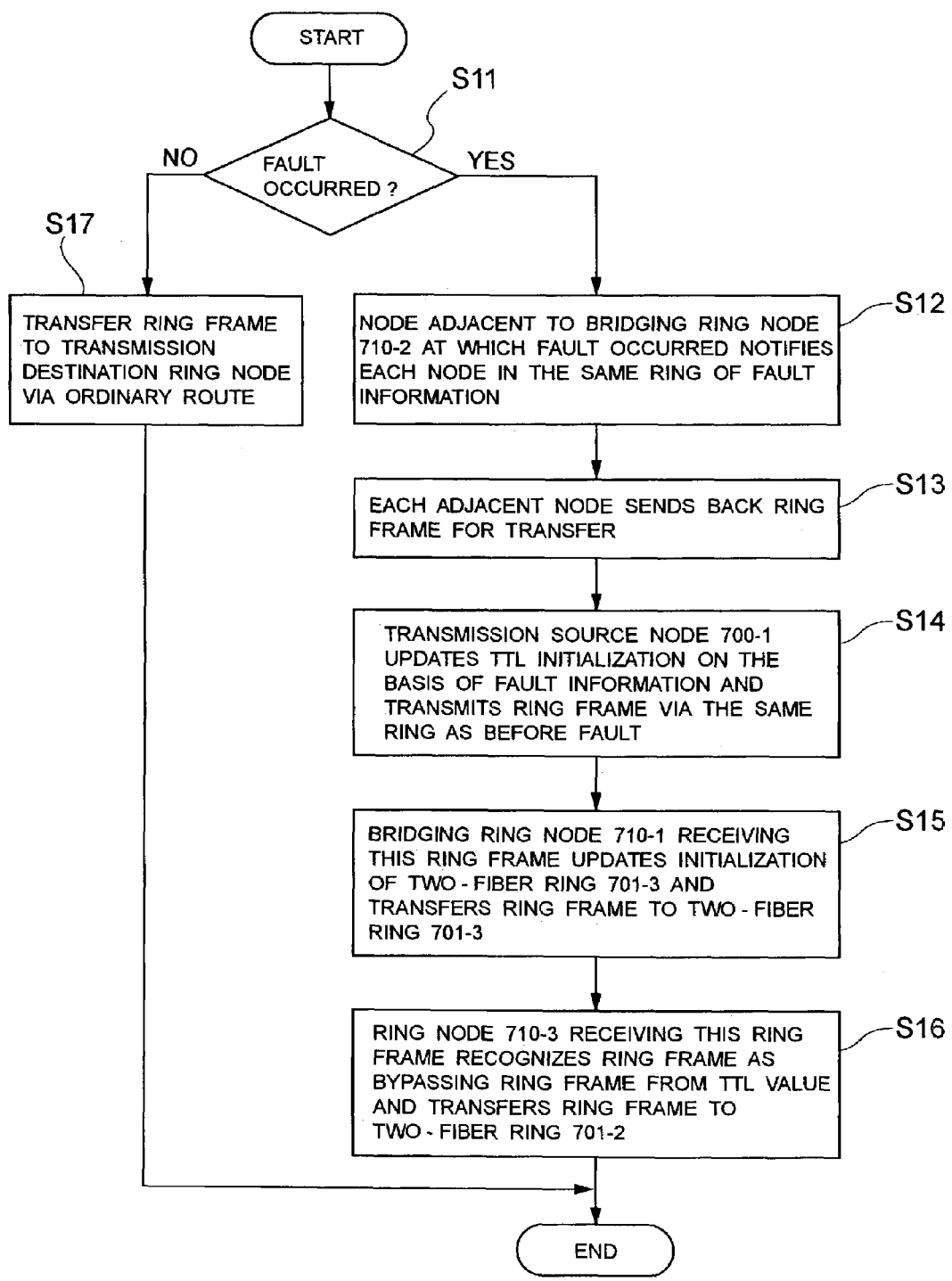
FIG. 13 is a flowchart showing the operation of the third embodiment of the invention.
Figure 14:
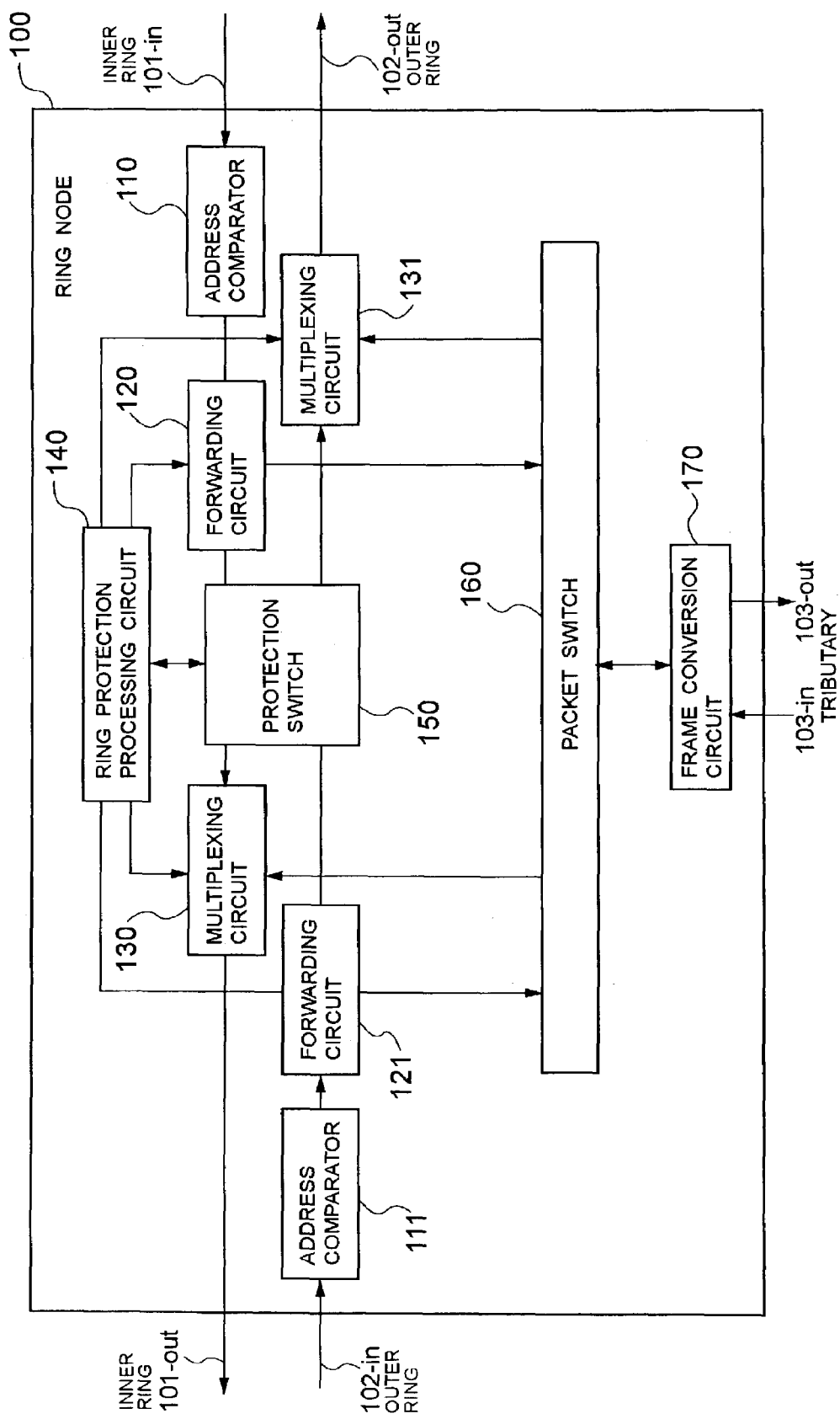
FIG. 14 is a diagram showing the configuration of a ring node using a conventional SRP technique.
Figure 15:
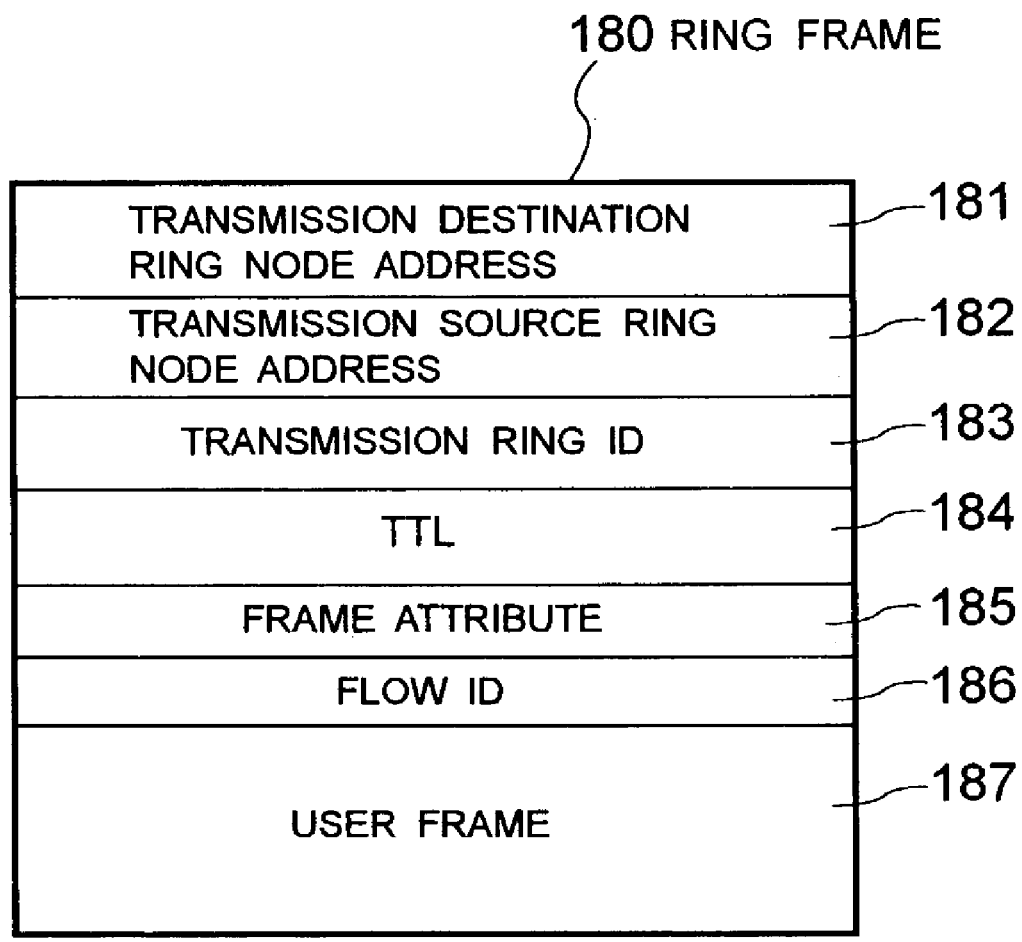
FIG. 15 is a diagram showing the configuration of a ring frame using a conventional SRP technique.
Figure 16:
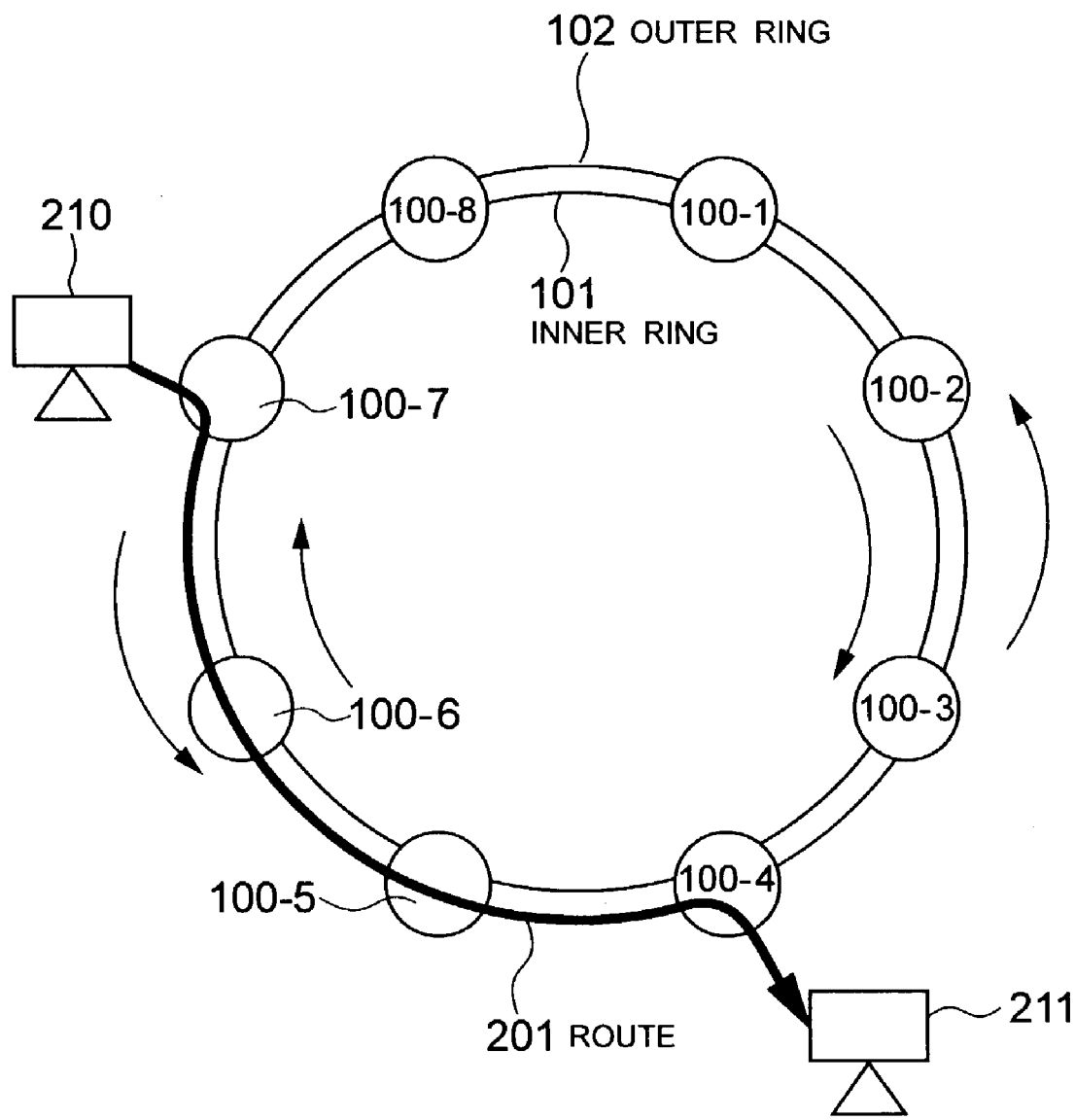
FIG. 16 is a diagram showing conventional unicast frame transfer.
Figure 17:
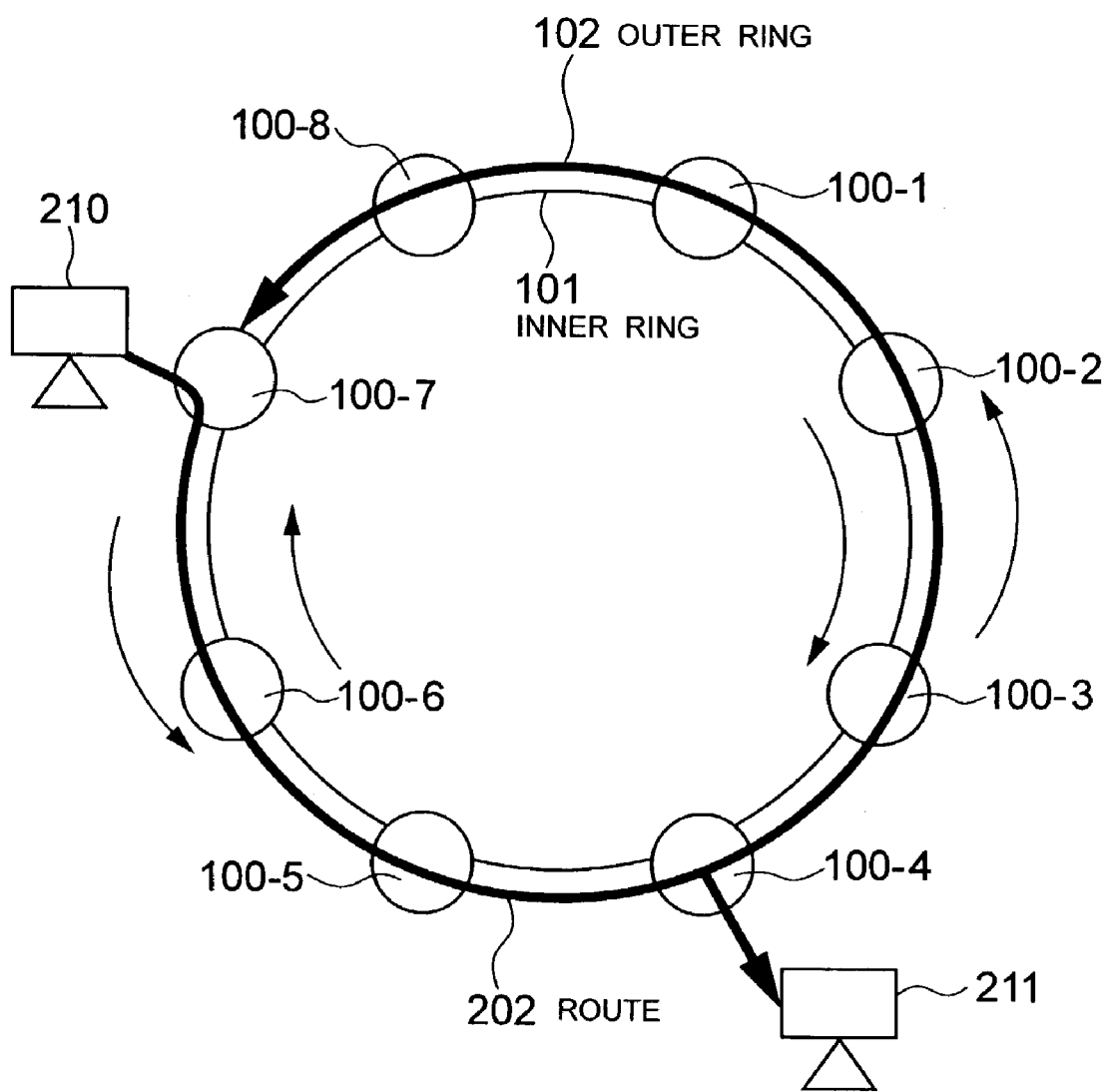
FIG. 17 is a diagram showing conventional multicast/broadcast frame transfer.
Figure 18:
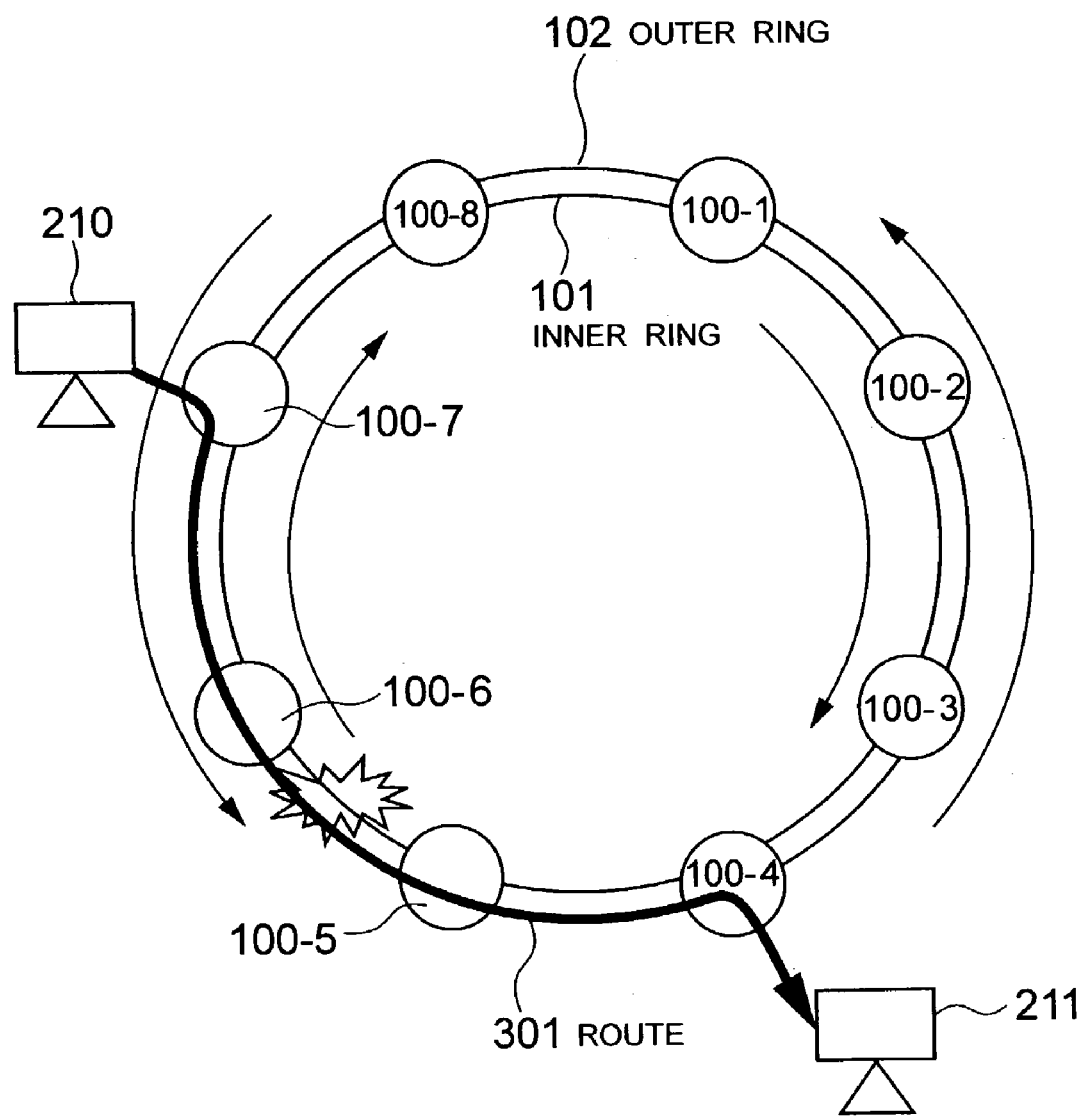
FIG. 18 is a diagram showing a protection method using a conventional SRP technique.
Figure 19:
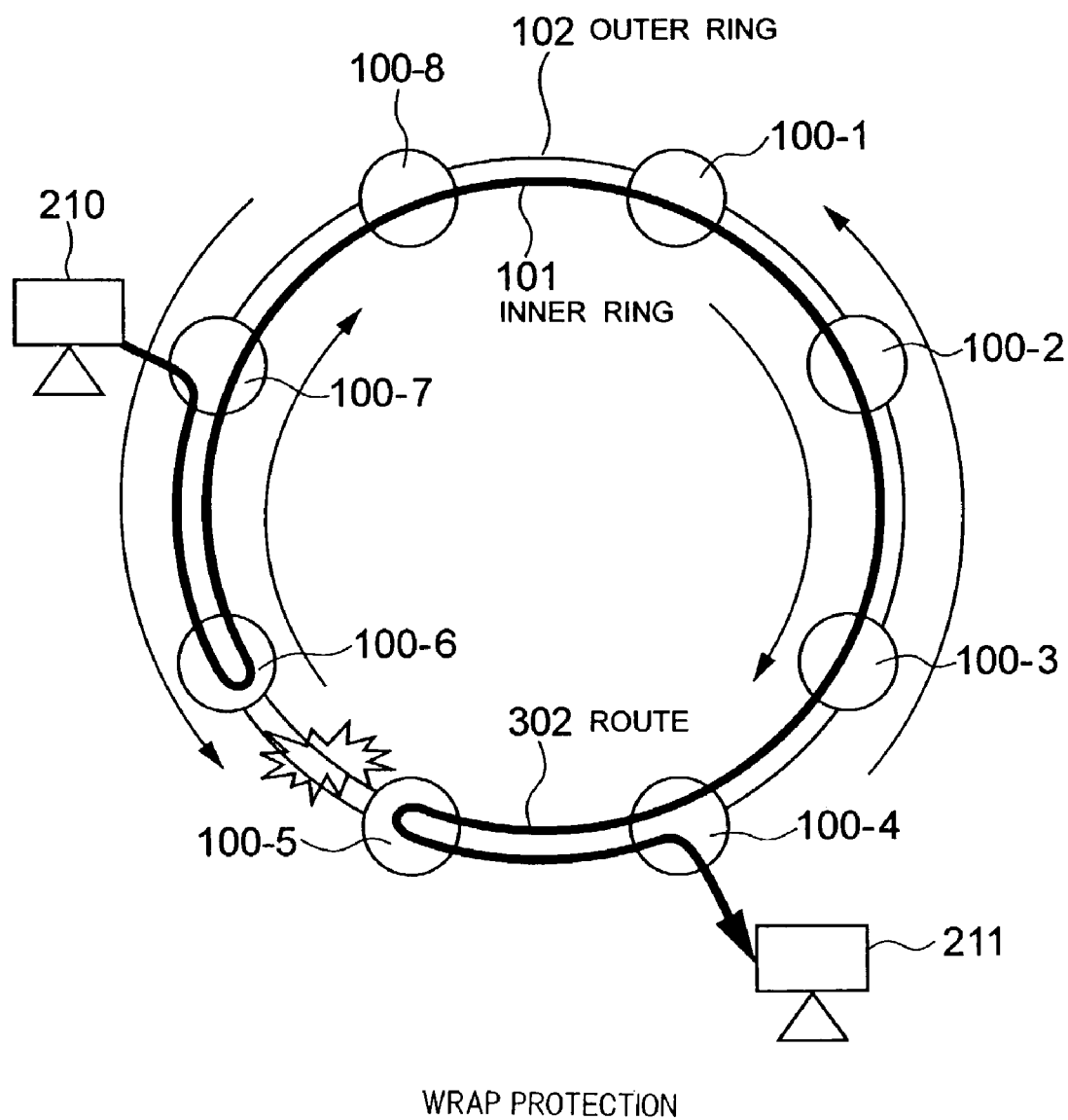
FIG. 19 is a diagram showing the protection method using a conventional SRP technique.

A method for protection from an inter-ring bridge node fault in accordance with the present invention will be described with reference to FIGS. 4 to 6 and also to the flowchart of FIG. 13 showing the operation of the third embodiment. It is assumed that a faulty-end wrap protection method based on the conventional art is used as an in-ring protection method.

Figure 4:
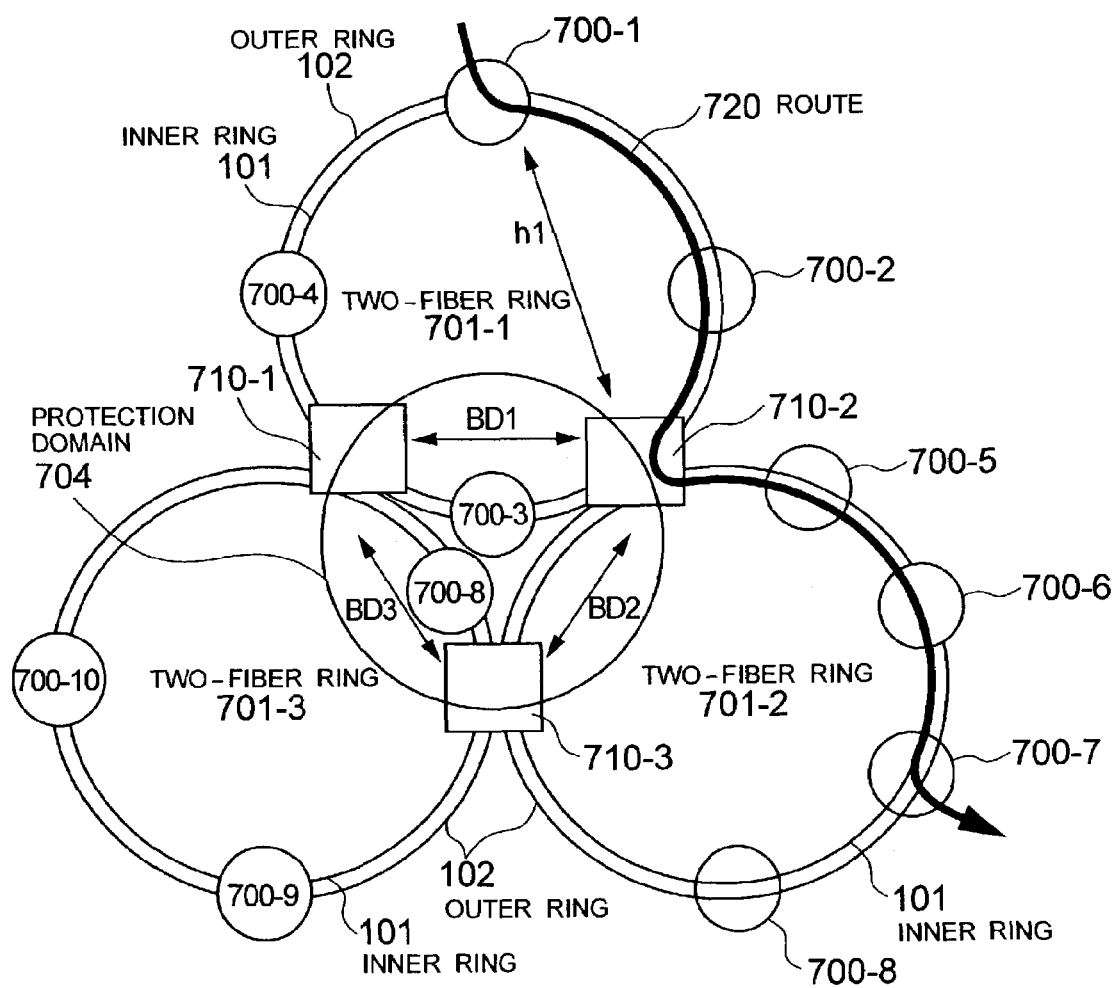
FIG. 4 is a diagram showing the operation of a third embodiment of the invention.
Figure 5:
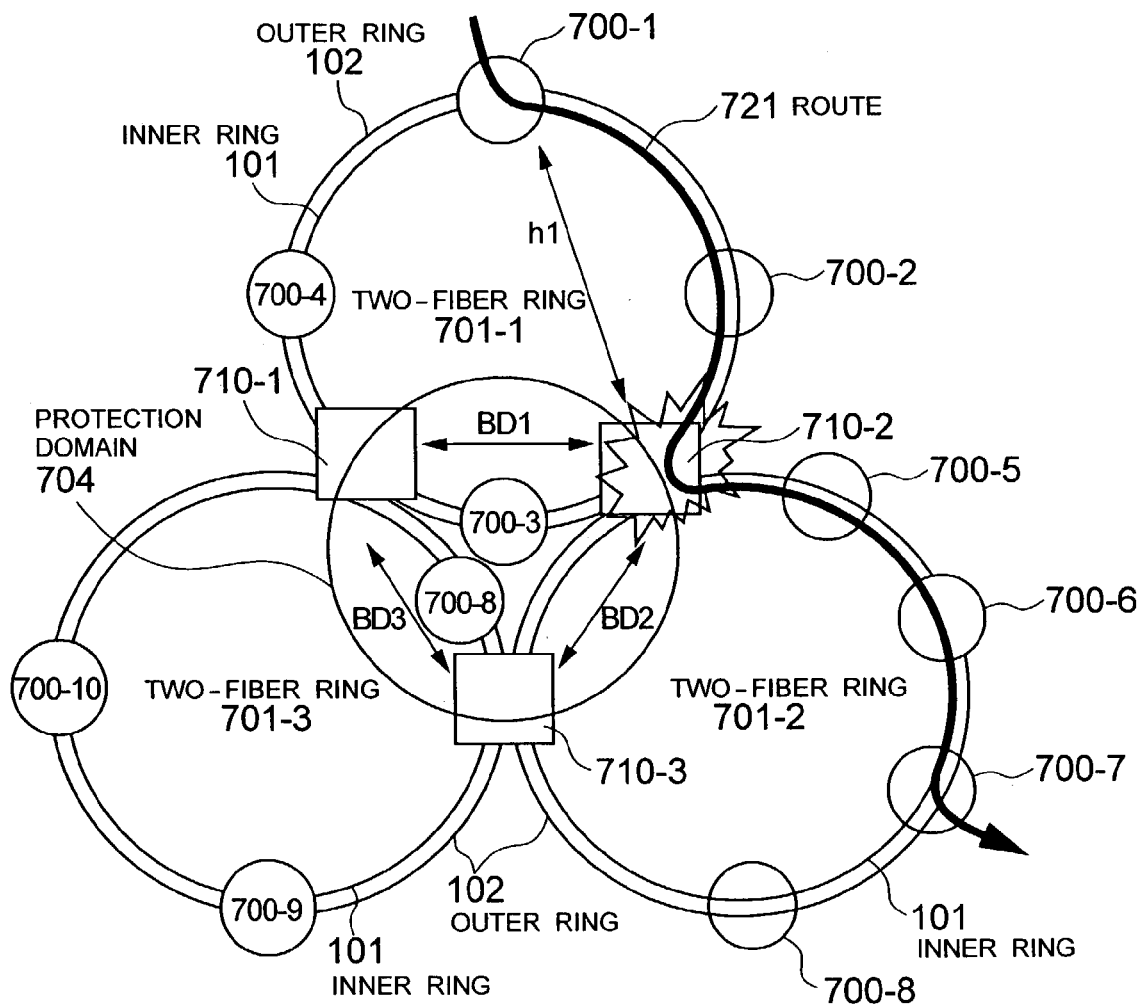
FIG. 5 is a diagram showing the operation of the third embodiment of the invention.
Figure 6:
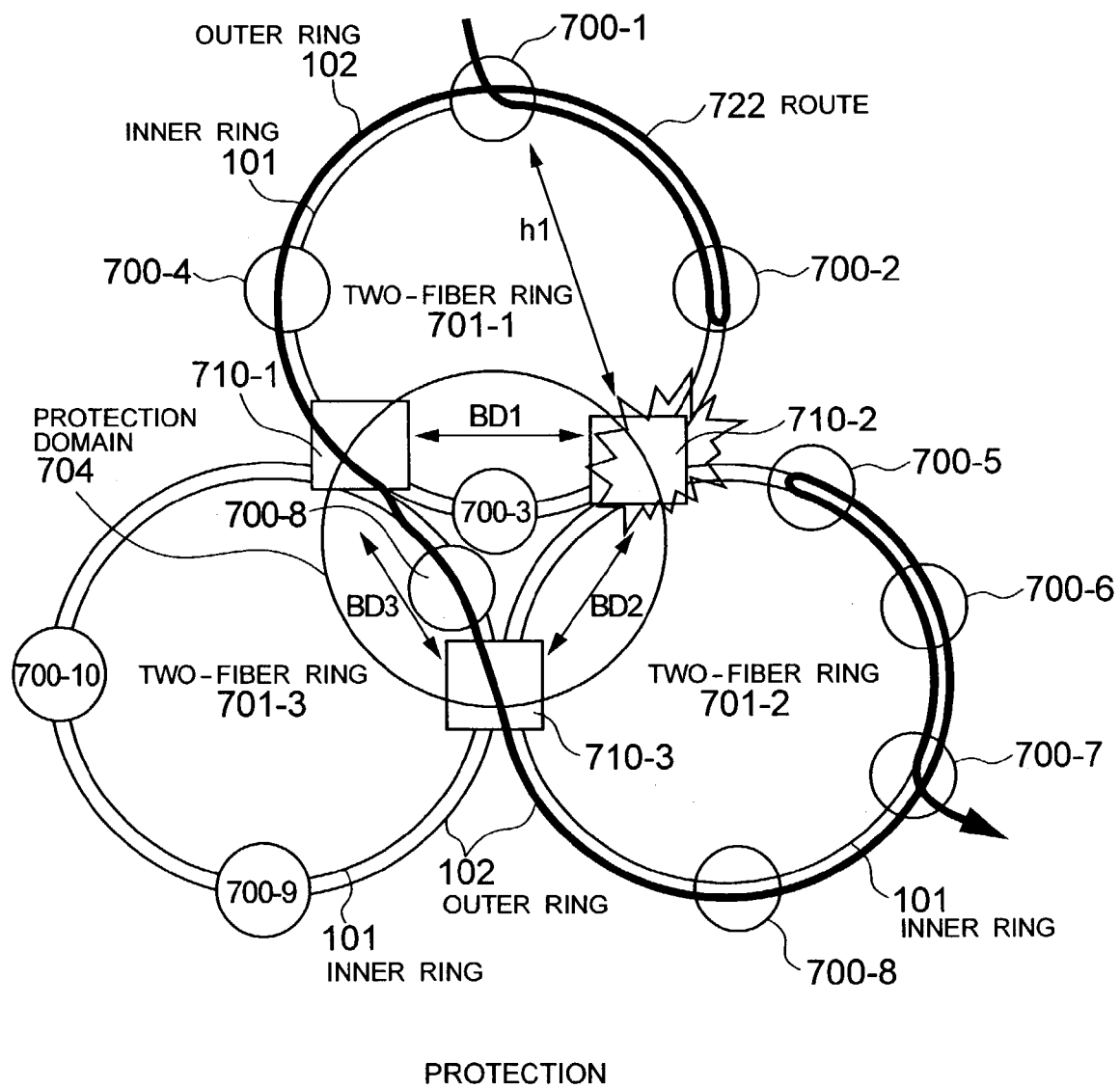
FIG. 6 is a diagram showing the operation of the third embodiment of the invention.

FIGS. 4 to 6 show a multiring configuration in which two-fiber rings 701-1 to 701-3 each formed by ring nodes 700 are bridged by ring nodes 710.

In each of the two-fiber rings 701-1 to 701-3, each of the ring nodes 700 and 710 belonging to the two-fiber ring monitors the fault condition of its junction links. In the event of a fault, the ring node notifies the other ring nodes 700 and 710 belonging to the same two-fiber ring 701-1, 701-2, or 701-3 of fault information. The ring nodes 710-1, 710-2, and 710-3 for inter-ring bridging belong to one protection domain 704. If a fault occurs at one of the ring nodes 710-1, 710-2, and 710-3, node ring fault protection by means of the other ring nodes is executed.

It is assumed that the numbers of hops BD1, BD2, and BD3 between the ring nodes 710-1 and 710-2, between the ring nodes 710-2 and 710-3, and between the ring nodes 710-3 and 710-1, respectively, are given in advance, and that the same frame as the above-described ring frame 180 is transferred between the ring nodes 700 and 710. It is also assumed that, in a situation where no fault occurs, a ring frame 180 is given TTL values A_1, A_2, and A_3 as the initial values of TTL 184 with respect to the two-fiber rings 701-1 to 701-3, and that each of the ring nodes 700 and 710 has the function of subtracting 1 from the TTL value in a ring frame 180 input through the inner ring 101 or the outer ring 102 and output to the inner ring 101 or the outer ring 102.

As shown in FIG. 4, a ring frame 180 to be transferred from the ring node 700-1 to the ring node 700-7 is transferred on a route 720 via the bridge formed by the ring node 710-2. It is assumed that the ring node 700-1 has already been informed of the number of hops h1 to the ring node 710-2 forming the bridge through which the ring frame 180 is transmitted to the transmission destination ring node 700-7.

In a situation where no fault occurs at any of the ring nodes 710-1, 710-2, and 710-3 forming the bridge (in the case of NO in S11 of FIG. 13), the ring frame 180 transmitted from the ring node 700-1 of the two-fiber ring 701-1 is transferred to the ring node 700-7 on the route 720 via the ring node 710-2 (S17 in FIG. 13).

If a fault occurs at the ring node 710-2 forming the bridge through which a ring frame 180 is transferred from the ring node 700-1 of the two-fiber ring 701-1 to the ring node 700-7 of the two-fiber ring 701-2 on a route 721, the protection method shown in FIGS. 5 and 6 is executed.

The ring nodes 700-2 and 700-3 adjacent to the ring node 710-2 of the two-fiber ring 701-1 propagate in-ring fault information through the inner ring 101 and the outer ring 102 to notify all the ring nodes 700-1 to 700-4, 710-1, and 710-2 in the two-fiber ring 701-1 of the fault (S12 in FIG. 13).

The adjacent ring node 700-2 sends back the ring frame 180 transferred from the inner ring 101 to the ring node 710-2 (see FIG. 6) to transfer the ring frame 180 to the outer ring 102, while the fault-adjacent ring node 700-3 sends back the ring frame 180 transferred from the outer ring 102 to the ring node 710-2 to transfer the ring frame 180 to the inner ring 101 (S13 of FIG. 13).

Similarly, the ring nodes 700-9 and 700-5 adjacent to the ring node 710-2 in the two-fiber ring 701-2 propagate in-ring fault information through the inner ring 101 and the outer ring 102 to notify all the ring nodes 700-5 to 700-9, 710-1, and 710-3 in the two-fiber ring 701-2 of the fault (S12 in FIG. 13).

Also, the adjacent ring nodes 700-5 and 700-9 send back the ring frame 180 transferred to the ring node 710-2 (S13 of FIG. 13).

When each of the ring nodes 700-1 of the two-fiber ring 701-1 recognizes the fault at the ring node 710-2 from the in-ring fault notice, and when it sends out the ring frame 180 originally routed via the ring node 710-2, it stores as TTL 184 the result (A+h1+i) of addition of the number of hops h1 to the ring node 710-2 and a fixed value i to the TTL initial value A, and transmits the ring frame 180 through the same ring as that before the occurrence of fault (S14 of FIG. 13).

In the ring node 710-1, a TTL extract value X which is a condition for extraction of the bypassing ring frame 180 is set as described below. In the following, n is the total number of ring nodes 700 and 710 in the entire two-fiber ring 701-1.

(A) In the case where BD1 is 1,
i) the condition that the transmission ring ID 183 and the ID of the receiving ring coincide with each other and TTL extract value X=A+i+2, or
ii) the condition that the transmission ring ID 183 and the ID of the receiving ring are different from each other and TTL extract value X=A_1+i−n+4 is satisfied with respect to the ring frame 180.

(B) In the case where BD1 is equal to or larger than 2, (B-1) if the ring frame 180 before reaching the ring node 700 or 710 at one end of the faulty section is transferred through a bypass, TTL extract value X=A_1+i+BD1+1;
(B-2) if the ring frame 180 sent back only by the ring node 700 or 710 at one end of the faulty section is received,
i) the condition that the transmission ring and the receiving ring are different and TTL 184=(A_1+i+1)−(n−BD1−2), or
ii) the condition that the transmission ring and the receiving ring are different and TTL 184=(A_1+i+1)−(BD1−2) is satisfied with respect to the ring frame 180; and
(B-3) if the ring frame 180 sent back by both of the ring nodes 700 or 710 at the opposite ends of the faulty section is received,
i) the condition that the transmission ring and the receiving ring are the same and TTL 184=(A_1+i+1)−(n+BD1−4), or
ii) the condition that the transmission ring and the receiving ring are the same and TTL 184=(A_1+i+1)−(2*n−BD1−4) is satisfied with respect to the ring frame 180.

The ring node 710-1 extracts the bypassing ring frame 180 using one of the TTL extraction conditions (A), (B-1) to (B-3).

The ring node 710-1 receiving the ring frame 180 to be transferred to the ring node 710-2 transfers the ring frame 180 to the two-fiber ring 701-3. At this time, a value obtained by adding the number of hops BD3 to the ring node 710-3 and a predetermined value k (integer k≧0) to the initial value A_3 of two-fiber ring 701-3 is stored as TTL 184 in the ring frame 180. The ring frame 180 is transferred to the inner ring 101 or the outer ring 102 according to the number of hops BD3 (S15 of FIG. 13).

The ring node 710-3 recognizes as a bypassing ring frame the ring frame 180 in which the TTL 184 is A_3+1+k among ring frames 180 received by it, and transfers the bypassing ring frame 180 to the two-fiber ring 701-2 (S16 in FIG. 13). The ring node 710-3 recognizes that bypassing transfer of the bypassing ring frame 180 is completed since it knows that the fault has occurred at the ring node 710-2 on the two-fiber ring 701-2. When the ring node 710-3 transfers the ring frame 180 to the two-fiber ring 701-2, it writes the TTL initial value A_2 of the two-fiber ring 703-2 in TTL 184 in the usual way and outputs the ring frame 180 from the inner ring 101 or the outer ring 102.

Thus, protection of the ring frame 180 transferred from the ring node 700-1 to the ring node 700-7 is completed by using the ring nodes 710-1 and 710-3 on the route 722 shown in FIG. 6.

As described above, inter-ring protection can be effected even if a fault occurs at a ring node which performs inter-ring bridging in a case where the wrap protection method is used as an in-ring protection method.

While this embodiment has been described by assuming that the ring node 700 or 710 which transfers a ring frame 180 via the ring node 710 which performs inter-ring bridging is given in advance the number of hops to the ring node 710, it is possible to dynamically know the number of hops by learning if ring frames 180 transferred in two directions exist. For example, if, in the network shown in FIGS. 4 to 6, ring frames 180 are being transferred in two directions between the ring node 700-1 and the ring node 700-7, the ring node 700-1 and the ring node 700-7 can compare the TTL 184 of a ring frame 180 transferred from the ring node 710-1 with TTL initial values A and B of the two-fiber rings 701-1 and 701-2 to know the number of hops about the ring node 710-1 forming the bridge through which the ring frame 180 is transmitted. Also, the ring node 710-1 can compare the TTL 184 of a ring frame 180 transmitted from the ring node 700-1 and the TTL 184 of a ring frame 180 transmitted from the ring node 700-7 with TTL initial values A_1 and A_2 of the two-fiber rings 701-1 and 701-2 to know the number of hops of the ring frames 180 from the input ring nodes 700-1 and 700-7 in the two-fiber rings 701-1 and 701-2.

In this embodiment, bridging between the rings is performed by the same ring nodes according to the combination of the transmission destination ring node address 181 and the transmission source ring node address 182 in ring frames 180. However, the bridging ring nodes 710 may be changed with respect to flows if a flow identifier such as a virtual local area network (VLAN) tag or a customer ID is used. In such a case, the number of hops in the two-fiber rings 701-1 to 701-3 may be given in advance with respect to flows or can be easily known by learning or the like.

In this embodiment, the ring nodes 710-1 to 710-3 in one protection domain execute inter-ring protection by only referring to the value of TTL 184 in an input ring frame 180, and do not perform inter-ring fault information notice transfer therebetween. However, those ring nodes may grasp the fault condition by performing inter-ring fault detection or fault information transfer specific to the protection domain. Inter-ring fault detection may be performed in such a manner that a keep alive signal is transferred between the adjacent ring nodes 710 belonging to one inter-ring protection domain, and a fault is recognized if the keep alive signal is not received during a certain period of time. The ring node 710 detecting the fault transfers fault information to all the ring nodes 710 in the inter-ring protection domain 704. Each ring node 710 receiving the fault information sets TTL extract value X for extraction of ring frame 180.

Fourth Embodiment

The configuration of an example of the ring node 700 used in a third embodiment of the present invention will be described with reference to FIG. 7.

The ring node 700 is constituted by address comparators 110 and 111, forwarding circuits 120 and 121, multiplexing circuits 130 and 131, a protection switch 150, a packet switch 160, a frame conversion circuit 170, a ring node protection circuit 810, a TTL updating circuit 820, and a TTL management circuit 830.

The address comparators 110 and 111, the forwarding circuits 120 and 121, the multiplexing circuits 130 and 131, the protection switch 150, the packet switch 160, and the frame conversion circuit 170 have the same functions as those of the corresponding components in the above-described conventional ring node, and differ only in input/output connection of functional blocks. The description for the functions of these component will not be described. Description will be made only of differences in functional block connection. While the connections of the functional block are changed, the interfaces between the functional blocks remain the same.

Each of the forwarding circuits 120 and 121 sends out a ring frame 180 to the ring node protection circuit 810, while the corresponding circuit sends a ring frame 180 to the ring protection processing circuit 140 in the conventional ring node.

The packet switch 160 receives a ring frame 180 from the frame conversion circuit 170 via the TTL updating circuit 820 instead of directly receiving from the frame conversion circuit 170.

Each of the multiplexing circuits 130 and 131 receives a ring frame 180 from the ring node protection circuit 810 instead of receiving from the ring protection processing circuit 140 of the conventional ring node.

The mode change control of the protection switch 150 is performed by the ring node protection circuit 810 in place of the ring protection processing circuit 140.

The functional blocks newly added in the ring node 700 will now be described.

The TTL updating circuit 820 sets TTL 184 in a ring frame 180 transferred from the frame conversion circuit 170 to a predetermined value with respect to each of different combinations of transmission destination ring node address 181 and transmission source ring node address 182 in the ring frame 180 or with reference to flow ID 186. This value is given by the TTL management circuit 830.

The ring node protection circuit 810 manages the fault condition of the junction links of the inner ring 101 and the outer ring 102 by referring to ring frames 180 containing fault information and received from the forwarding circuits 120 and 121, and changes the mode of the protection switch 150 to the wrap mode when it detects a fault. Also, when the ring node protection circuit 810 detects a junction link fault, it forms a ring frame 180 containing fault information indicating that this node is a fault detecting node, and transmits this ring frame 180 to the multiplexing circuits 130 and 131.

When the ring node protection circuit 810 receives from the forwarding circuits 120 and 121 a ring frame 180 containing fault information from some of the other ring nodes, it notifies the TTL management circuit 830 of the fault detecting ring node address, rewrites the transmission destination ring node address 181 and the transmission source ring node address 182 in the ring frame 180, and transmits the ring frame 180 to the multiplexing circuit 130 or 131 in the same ring as that from which the ring frame 180 has been received.

The TTL management circuit 830 determines the TTL value with respect to each of combinations of the transmission destination and transmission source ring nodes or flows on the basis of topology information on the two-fiber ring to which this node belongs. The TTL management circuit 830 notifies the TTL updating circuit 820 of this value. When the network is free from any fault, the TTL management circuit 830 notifies the TTL updating circuit 820 of the TTL initial value A common to all the combinations of the transmission destination and transmission source ring nodes or all flows. The TTL initial value A notified at this time is a value common to the ring nodes 700 and 710 in the same two-fiber ring.

The TTL management circuit 830 locates the fault point on the basis of fault detecting ring node information notified from the ring node protection circuit 810. If the fault corresponds to one ring node 710 for inter-ring bridging, the TTL management circuit 83 recomputes the TTL value with respect to a set of transmission destination and transmission source ring nodes or a flow inter-ring bridged by the ring node 710, and notifies the TTL updating circuit 820 of the computation result. This TTL initial value is a value obtained by adding the number of hops h to the faulty ring node 710 and a certain characteristic value i to the TTL initial value A set with respect to the fault-free state.

Figure 8:
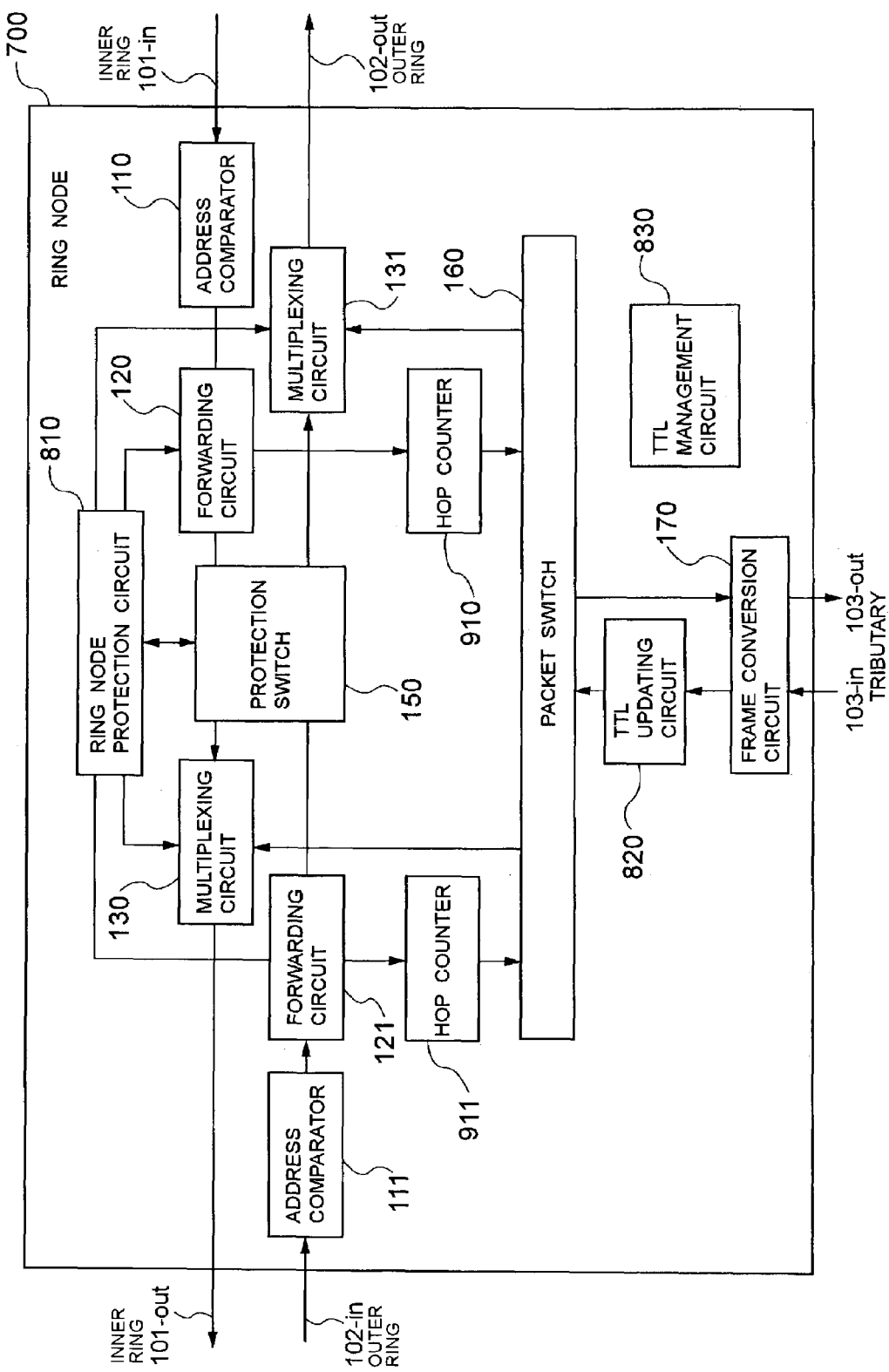
FIG. 8 is a diagram showing another example of the configuration of the fourth embodiment of the invention.

In the TTL management circuit 830, sets of transmission destination and transmission source ring nodes or flows inter-ring bridged by a faulty ring node may be given in advance or may be known by learning. FIG. 8 is a diagram showing a node configuration for knowing them by learning.

FIG. 8 shows the configuration of a ring node 700 arranged to know by learning the number of hops to one ring node 710 for inter-ring bridging.

Figure 7:
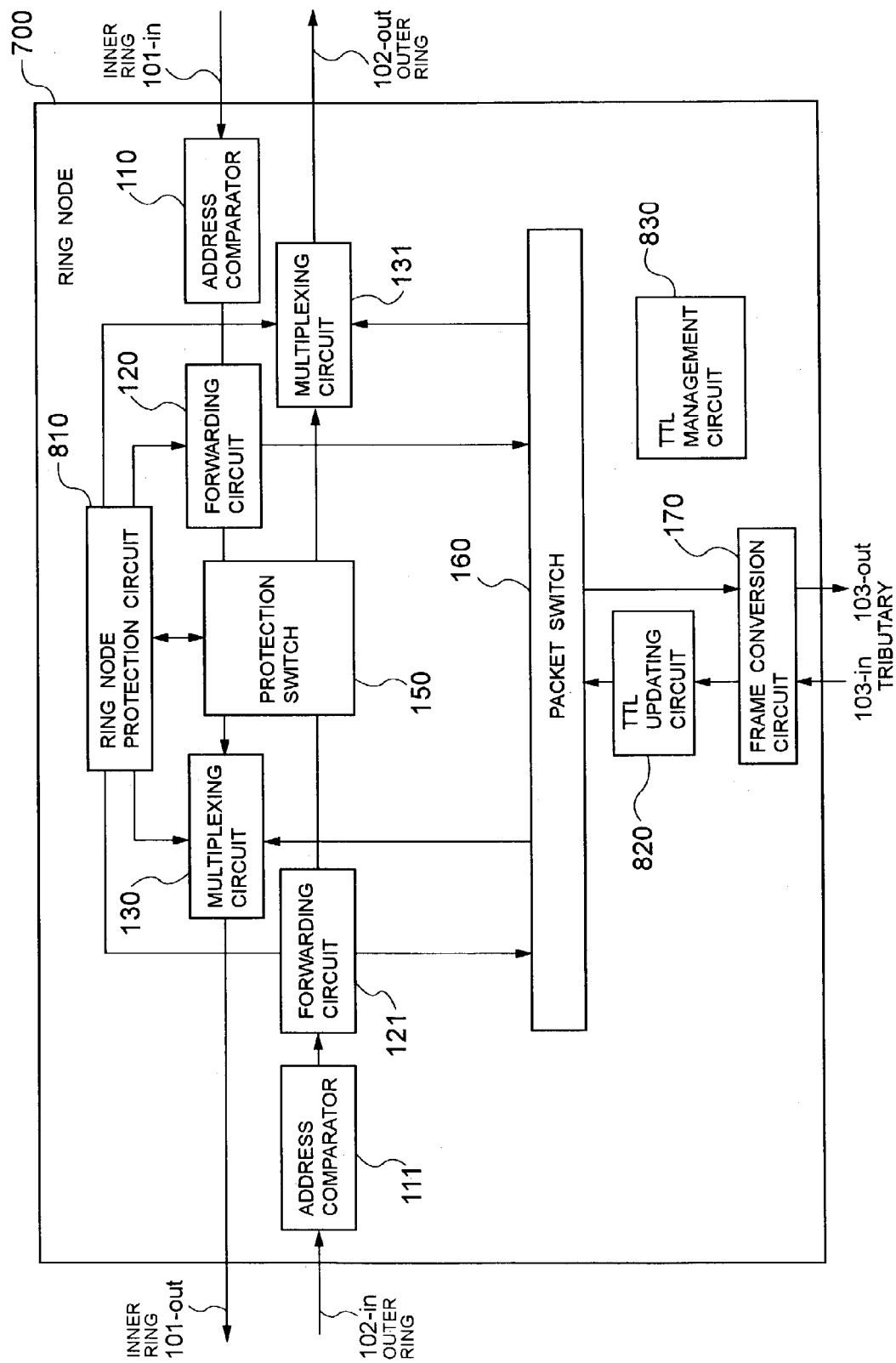
FIG. 7 is a diagram showing the configuration of a fourth embodiment of the invention.

The ring node 700 shown in FIG. 8 is formed by adding hop counters 920 and 921 to the configuration of the ring node 700 shown in FIG. 7.

The hop counter 920 or 921 refers to TTL 184 in a ring frame 180 transferred from the forwarding circuit 120 or 121, computes the number of hops of the ring frame 180 in the two-fiber ring from the difference from the TTL initial value A, and thereafter transfers the ring frame 180 to the packet switch 160. The result of computation of the number of hops is notified to the TTL management circuit 830 along with the transmission source ring node address 182 or flow ID 186 in the ring frame 180.

The TTL management circuit 830 stores the number of hops in the two-fiber ring to be made in a case where a ring frame 180 in which the address of the flow ID according to the received transmission source ring node address 182 or flow ID 186 is set as transmission destination ring node address 181 or flow ID 186 is transmitted.

If the ring node 700 has the configuration shown in FIG. 8, the number of hops of a ring frame 180 to one ring node 710 for inter-ring bridging can be known by learning instead of being given in advance.

The second method for protection from a ring node fault at an inter-ring bridging node in accordance with the present invention can be realized by arranging ring nodes of the above-described configuration.

Fifth Embodiment

The configuration of an example of the ring node 710 for inter-ring bridging to be used in the third embodiment of the present invention will be described with reference to FIGS. 9 to 11.

The ring node 710 is constituted by multiplexing circuits 130-1, 130-2, 131-1, and 131-2, protection switches 150-1 and 150-2, a ring bridge 650, ring node protection circuits 810-1 and 810-2, TTL updating circuits 820-1, 820-2, 821-1, and 821-2, bridge determination circuits 1010-1, 1010-2, 1011-1, and 1011-2, and TTL management circuits 1020-1 and 1020-2. The functional blocks other than the ring bridge 650 are provided in two units in correspondence with two-fiber rings. In FIG. 10, functional blocks corresponding to two-fiber rings are indicated by symbols such as x-1 and x-2 (x: functional block number). For ease of description, indication with "-1" and "-2" is omitted.

The functions of the functional blocks other than the bridge determination circuits 1010 and 1011 and the TTL management circuit 1020 are the same as those described above with respect to the conventional art and the first to third embodiments of the present invention. The functional blocks differ only in mode of input/output connection therebetween. The ring node 710 will be described mainly with respect to points of difference relating to the connections between the functional blocks. The interfaces between the functional blocks are the same as those described above.

A ring frame 180 input from the inner ring 101-in or the outer ring 102-in is input to the bridge determination circuit 1010 or 1011.

The bridge determination circuit 1010 or 1011 transfers to the ring node protection circuit 810 a ring frame 180 in which transmission destination ring node address 181 designates this node and the frame attribute 185 is "in-ring fault information", transfers to the ring bridge 650 a ring frame 180 designated as a frame to be transferred via bypass route and a ring frame 180 satisfying a bypass condition including the TTL extract value X, and transfers to the protection switch 150 a ring frame 180 not to be transferred via a bypass route. The bypass condition and the TTL extract value X for bypassing of the bypassing ring frame 180 are given by the TTL management circuit 1020.

The ring bridge 650 transfers the transferred ring frame 180 to the desired TTL updating circuit 820 or 821 by bridging.

Each of the TTL updating circuits 820 and 821 updates the value of TTL 184 in the ring frame 180 transferred to it, and transfers the ring frame 180 to the multiplexing circuit 130 or 131. An update value of TTL 184 is given from the TTL management circuit 1020 with respect to each of sets of transmission destination and transmission source ring nodes or protected flows.

Each of the multiplexing circuits 130 and 131 multiplexes ring frames 180 from the ring node protection circuit 810, the protection switch 150, and TTL updating circuit 820 or 821 and sends out the multiplexed frames through the inner ring 101-out or the outer ring 102-out.

The TTL management circuit 1020 computes the TTL value with respect to each of combinations of the transmission destination and transmission source ring nodes or flows on the basis of topology information on the two-fiber ring to which this node belongs, as does the TTL management circuit 830. The TTL management circuit 1020 notifies the TTL updating circuit 820 or 821 of this value. If the next bypass bridging ring node 710 exists with respect to a ring frame 180 which is transferred by bridging when the bypass condition including the TTL extract value X is satisfied in the bridge determination circuit 1020 or 1021, the TTL management circuit 1020 sets the TTL value to a value obtained by adding the number of hops BD to the bypass bridging ring node 710 and the fixed value i to the common value A. In other cases, or with respect to a ring frame 180 not in a bypass flow, the TTL management circuit 1020 notifies the TTL updating circuit 820 or 821 of the common value A on the two-fiber ring.

Also, when the TTL management circuit 1020 recognizes an adjacent ring node fault on the same ring protection domain from fault detecting ring node information from the ring node protection circuit 810, it sends a control signal to the ring bridge 650 to return the ring frame 180 routed via the faulty ring node to the two-fiber ring upstream of the bridging node. Thereafter, the TTL management circuit 1020 notifies the TTL updating circuit 820 or 821 of setting of TTL 184 in the ring frame 180 to the value obtained by adding the number of hops BD to the bypass bridging ring node 710 and the fixed value i to the common value A.

The TTL management circuit 1020 sets the TTL extract value X in each of the bridge determination circuits 1020 and 1021. The TTL extract value X is set to A+1+i as long as no fault occurs at any of the adjacent inter-ring bridging ring nodes 710 in the same ring protection domain. If a fault occurs at one of the adjacent inter-ring bridging ring nodes 710 in the same ring protection domain, the TTL extract value X in the third embodiment of the present invention is used.

If the thus-arranged ring node is used as an inter-ring bridge, the second method for protection from inter-ring bridging ring node fault can be executed.

In the TTL management circuit 1020, sets of transmission destination and transmission source ring nodes or flows inter-ring bridged by a faulty ring node may be given in advance or may be known by learning. FIG. 10 is a diagram showing a node configuration for knowing them by learning.

Figure 10:
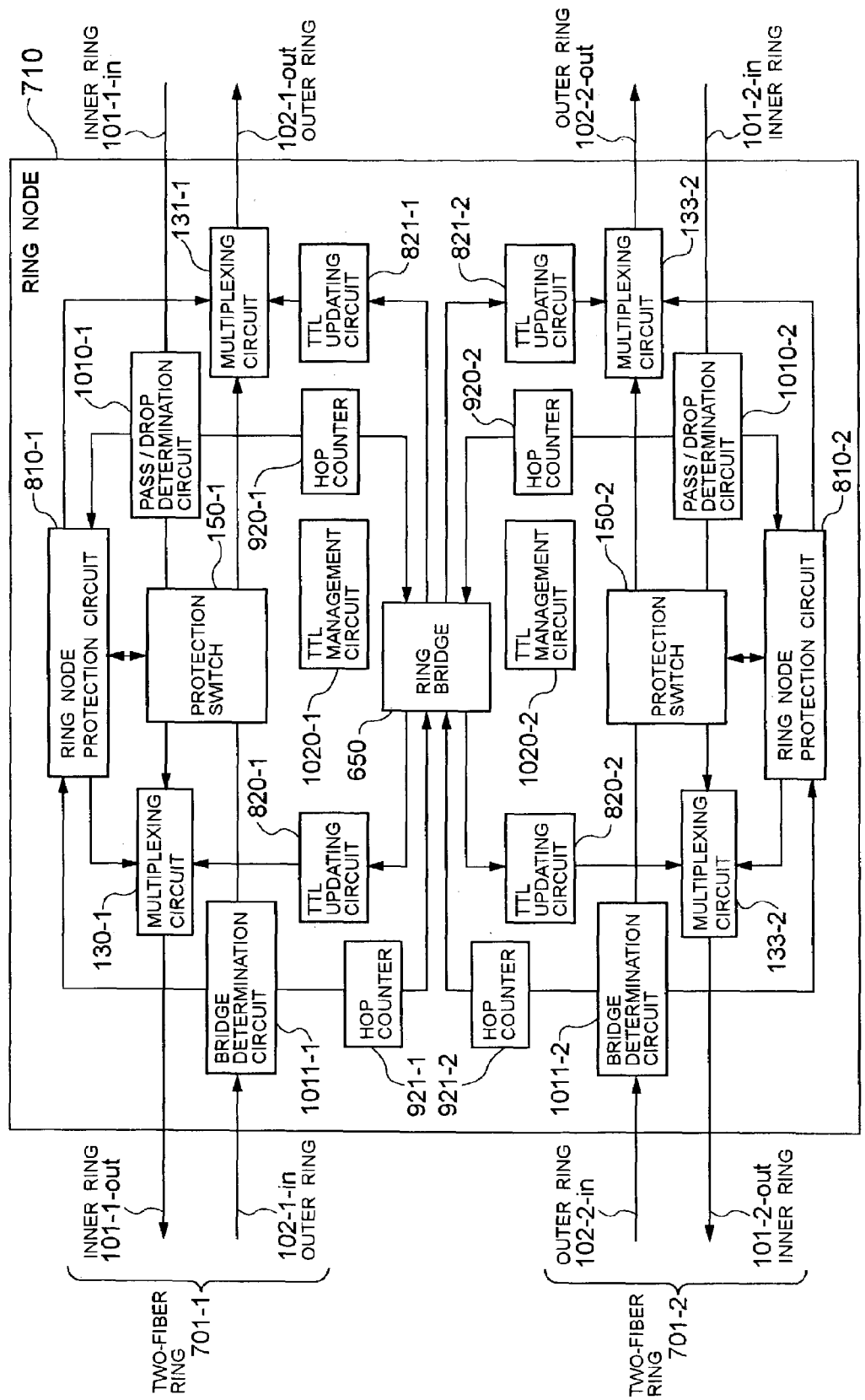
FIG. 10 is a diagram showing another example of the configuration of the fifth embodiment of the invention.
Figure 11:
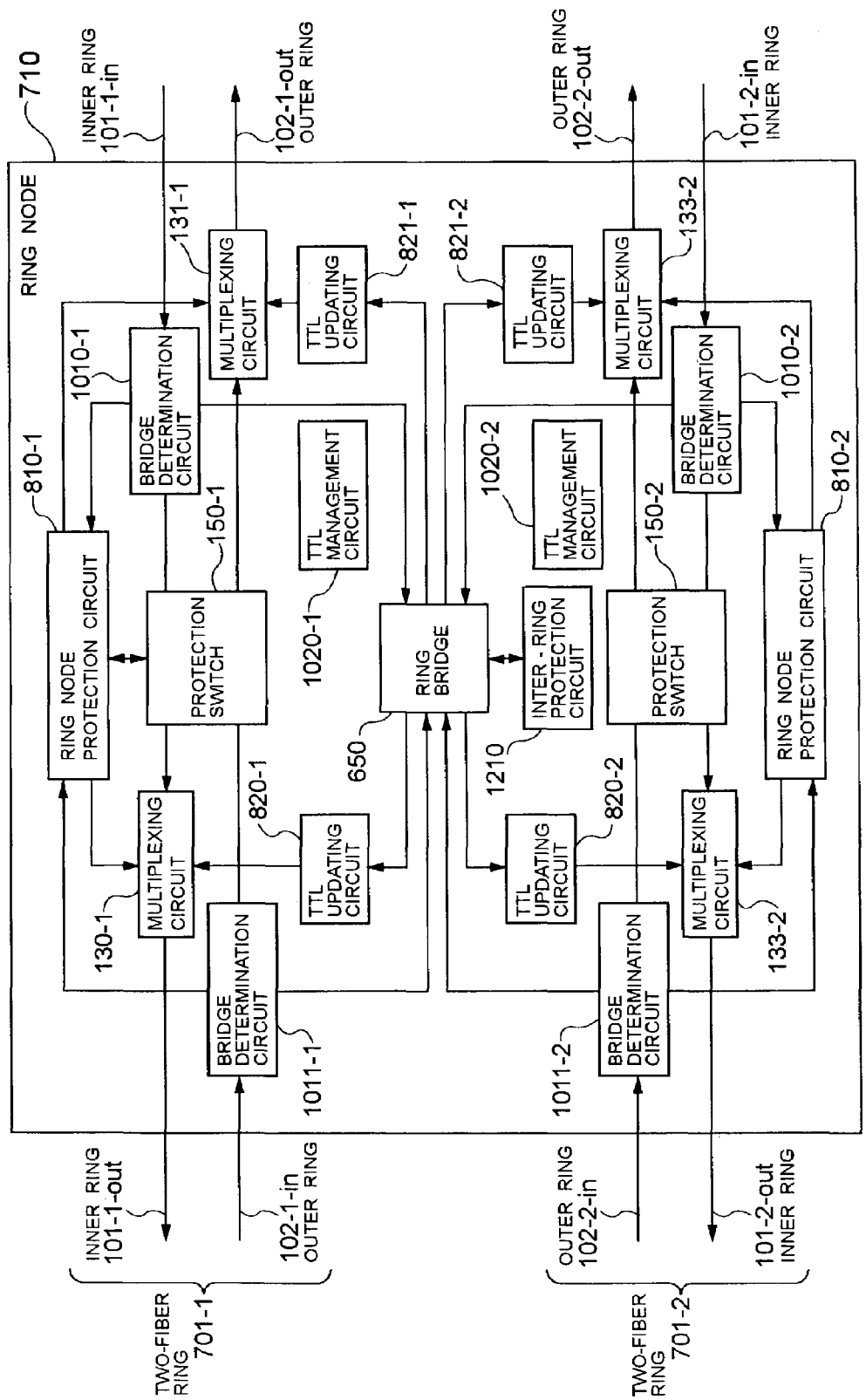
FIG. 11 is a diagram showing still another example of the configuration of the fifth embodiment of the invention.

FIG. 10 shows the configuration of a ring node 710 arranged to know by learning the number of hops to a ring node 710 for inter-ring bridging.

Figure 9:
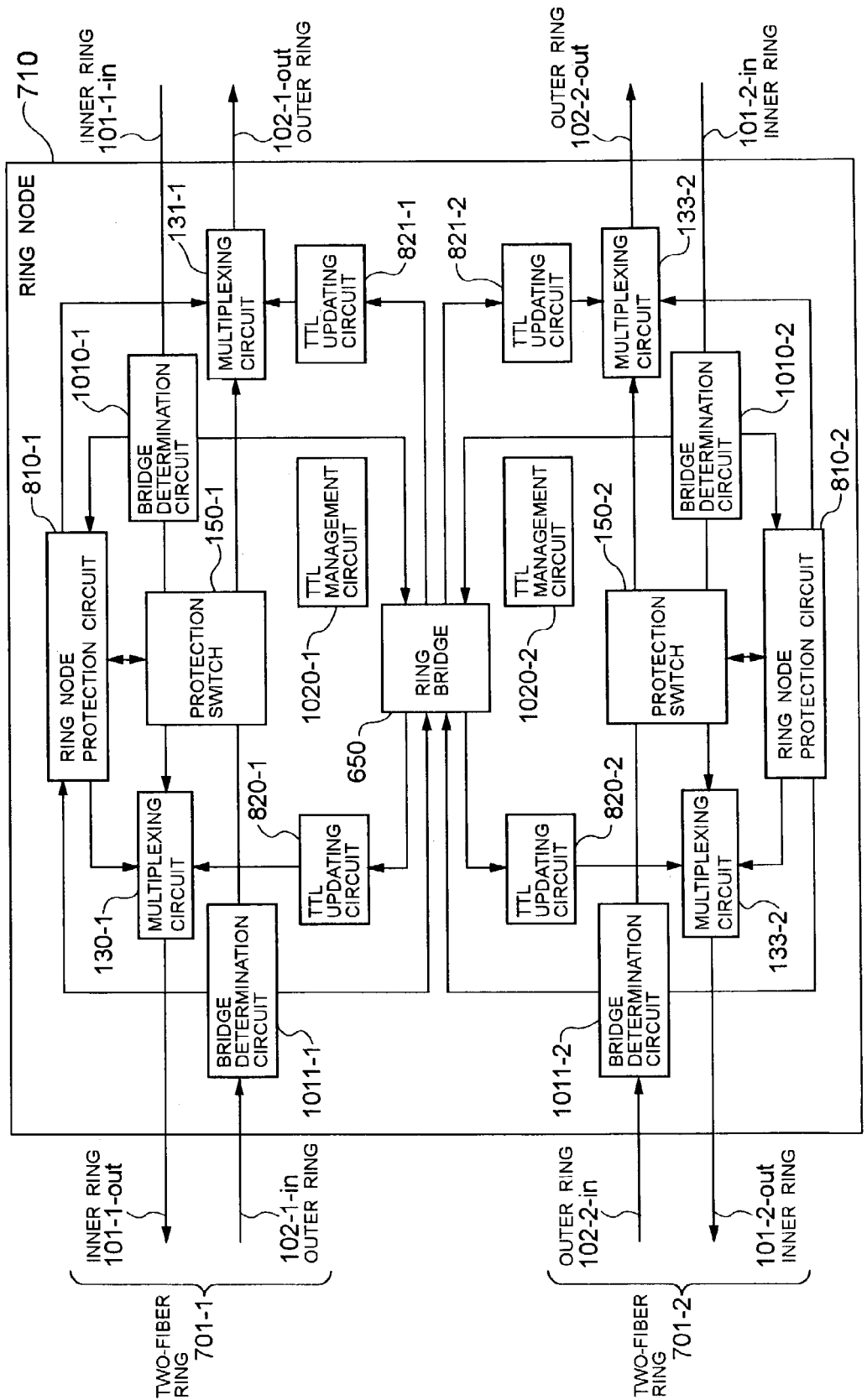
FIG. 9 is a diagram showing the configuration of a fifth embodiment of the invention.

The ring node 710 shown in FIG. 10 is formed by adding hop counters 920 and 921 to the configuration of the ring node 710 shown in FIG. 9.

The hop counter 920 or 921 refers to TTL 184 in a ring frame 180 transferred from the bridge determination circuit 1010 or 1011, computes the number of hops h of the ring frame 180 in the two-fiber ring from the difference from the TTL initial value A, and thereafter transfers the ring frame 180 to the ring bridge 650. The result of computation of the number of hops is notified to the TTL management circuit 1020 along with the transmission source ring node address 182 or flow ID 186 in the ring frame 180.

The TTL management circuit 1020 stores the number of hops in the two-fiber ring to be made in a case where a ring frame 180 in which the address of the flow ID according to the received transmission source ring node address 182 or flow ID 186 is set as transmission destination ring node address 181 or flow ID 186 is transmitted.

If the ring node 710 shown in FIG. 10 is used, the number of hops of a ring frame 180 to the ring node 710 for inter-ring bridging can be known by learning instead of being given in advance.

In this embodiment, the ring nodes 710 in one protection domain execute inter-ring protection by only referring to the value of TTL 184 in an input ring frame 180, and do not perform inter-ring fault information notice transfer therebetween. However, those ring nodes may grasp the fault condition by performing inter-ring fault detection or fault information transfer specific to the protection domain. FIG. 11 shows a configuration for enabling such operation. The ring node 710 shown in FIG. 11 is formed by adding an inter-ring protection circuit 1210 to the ring node 710 shown in FIG. 10. The inter-ring protection circuit 1210 transfers a keep alive signal between the adjacent ring nodes 710 belonging to one inter-ring protection domain, and recognizes a fault if the keep alive signal is not received during a certain period of time. The ring node 710 detecting the fault transfers fault information to all the ring nodes 710 in the inter-ring protection domain 704. Each ring node 710 receiving the fault information sets TTL extract value X for extraction of ring frame 180.

The multiring control method described above as the first or third embodiment may be realized as a program. Such a program may be executed by a computer in each ring node, e.g., the ring protection processing/topology management circuit 640-1 of the ring node 400 shown in FIG. 3, the ring node protection circuit 810 of the ring node 700 shown in FIG. 7, or the ring node protection circuit 810-1 of the ring node 710 shown in FIG. 9. Such a program may be formed of the steps shown in the flowcharts of FIGS. 12 and 13.

According to the present invention a method of controlling a multi-two-media ring network in which a plurality of two-media ring networks using ring nodes capable of transferring a network node interface (NNI) packet by using an inner ring or an outer ring and transferring the NNI packet to a desired network or terminal are connected includes a TTL value updating step of updating a time to live (TTL) value in the NNI packet when the NNI packet is transferred from one of the two-media ring networks to another of the two-media ring networks, and an NNI packet processing step of comparing the updated TTL value and a predetermined TTL discard value and discarding the NNI packet or transferring the NNI packet to an adjacent ring node according to the result of comparison. This method ensures that a broadcast/multicast frame transferred over rings in a multi-ring network can be efficiently discarded in a relay ring, and also ensures protection even when a fault occurs at an inter-ring bridging node.

A node and a control program according to the present invention also have the same effects as those of above-described control method.

More specifically, according to the ring frame discard method in the first aspect of the present invention and the ring node in the second aspect of the present invention, a ring frame is discarded in a relay ring regardless of a fault point or the kind of fault when the ring frame is received from the same ring as that to which it has been transmitted. Therefore, network resources are not wastefully used, while ring frames can be transferred to all the ring nodes.

According to the ring frame discard method in the first aspect of the present invention and the ring node in the second aspect of the present invention, a ring frame to be received by the ring node is transferred to the ring node only one time, and a plurality of occurrences of reception of the same ring frame by one ring node can be avoided, thus realizing efficient transfer.

According to the method of protection from an inter-ring bridging ring node fault in the third aspect of the present invention and the ring nodes in the fourth and fifth aspects of the present invention, a plurality of ring nodes for inter-ring bridging form a ring protection domain such that even when a fault occurs in one of the ring nodes, a flow routed via the ring node can be rerouted along a bypass formed by another of the ring nodes, thus effecting protection.

According to the method of protection from an inter-ring bridging ring node fault in the third aspect of the present invention and the ring nodes in the fourth and fifth aspects of the present invention, protection can be realized in such a manner that one of the ring nodes belonging to the same ring protection domain provides a bypass for a ring frame by only referring to the TTL value in the ring frame or by referring to the TTL value and comparing the transmission ring and the receiving ring. Thus, the present invention is advantageous in terms of simplicity and processing speed.

According to the method of protection from an inter-ring bridging ring node fault in the third aspect of the present invention and the ring nodes in the fourth and fifth aspects of the present invention, it is not necessary for ring nodes in one ring protection domain to exchange information on flows routed via the ring nodes. Thus, use of a complicated flow information exchange protocol and wasteful use of network resources accompanying the use of the protocol can be avoided.

According to the method of protection from an inter-ring bridging ring node fault in the third aspect of the present invention and the ring nodes in the fourth and fifth aspects of the present invention, two ring nodes relaying a ring frame can know the number of hops to them by performing transmission source learning and TTL learning in the ring frame transfer. Thus, the need for previously assigning the number of hops with respect to each of ring frame transmission source and transmission destination ring nodes or flows is eliminated to obtain the advantage in terms of ease of setting.

The method of protection from an inter-ring bridging ring node fault in the third aspect of the present invention and the ring nodes in the fourth and fifth aspects of the present invention can be realized by applying fault information transfer analogous to that in the case of a single ring to the ring nodes in the ring protection domain, and are therefore have a high degree of matching or affinity to single-ring fault information transfer.

The ring frame used in the ring frame discard method in the first aspect of the invention, the ring node in the second aspect of the invention, the method of protection from an inter-ring bridging ring node fault in the third aspect of the invention and the ring nodes in the fourth and fifth aspects of the invention can be identical to the existing ring frames, and do not require any change in the current standard interface.

What is claimed is:

1. A method of controlling a multi-two-media ring network in which a plurality of two-media ring networks using ring nodes transfer a network node interface (NNI) packet by using an inner ring or an outer ring and transfer the NNI packet to a desired network or terminal are connected, said method comprising:
   a TTL value updating step of updating a time to live (TTL) value in the NNI packet when the NNI packet is transferred from one of the two-media ring networks to another of the two-media ring networks; and
   an NNI packet processing step of comparing the updated TTL value and a predetermined TTL discard value and discarding the NNI packet or transferring the NNI packet to an adjacent ring node according to the result of comparison.

2. A method of controlling a multi-two-media ring network in which a plurality of two-media ring networks using ring nodes transfer an NNI packet by using an inner ring or an outer ring and transfer the NNI packet to a desired network or terminal are connected, said method comprising:
   a TTL value updating step of updating a TTL value in the NNI packet when the NNI packet is transferred from one of the two-media ring networks to another of the two-media ring networks;
   a TTL discard value recomputation step of recomputing a TTL discard value on the basis of in-ring fault information in the transferred NNI packet in a case where a fault occurs in some of the ring nodes in the another of the two-media ring networks; and
   an NNI packet processing step of comparing the updated TTL value and the recomputed TTL discard value and discarding the NNI packet or transferring the NNT packet to an adjacent ring node according to the result of comparison.

3. A ring node connected between a plurality of two-media ring networks using said ring node and other ring nodes transfer an NNI packet by using an inner ring or an outer ring and transfer the NNI packet to a desired network or terminal, said ring node comprising:
   TTL value updating means of updating a TTL value in the NNI packet when the NNI packet is transferred from one of the two-media ring networks to another of the two-media ring networks; and
   NNI packet processing means of comparing the updated TTL value and a predetermined TTL discard value and discarding the NNI packet or transferring the NNI packet to an adjacent ring node according to the result of comparison.

4. A ring node connected between a plurality of two-media ring networks using said ring node and other ring nodes transfer an NNI packet by using an inner ring or an outer ring and transfer the NNI packet to a desired network or terminal are connected, said ring node comprising:
   TTL value updating means of updating a TTL value in the NNI packet when the NNI packet is transferred from one of the two-media ring networks to another of the two-media ring networks;
   TTL discard value recomputation means of recomputing a TTL discard value on the basis of in-ring fault information in the transferred NNI packet in a case where a fault occurs in some of the ring nodes in the another of the two-media ring networks; and
   NNI packet processing means of comparing the updated TTL value and the recomputed TTL discard value and discarding the NNI packet or transferring the NNI packet to an adjacent ring node according to the result of comparison.

5. A ring node R1 in a multi-two-media ring network in which a plurality of two-media ring networks constituted by said ring node R1 and other ring nodes R1 transfer and receive an NNI packet by using an inner ring or an outer ring and transmit and receive the NNI packet with a terminal through a port are connected by ring nodes R2 which bridge the two-media ring networks, a ring protection domain being formed by a plurality of the ring nodes R2 bridging the two-media ring networks, said ring node R1 comprising:
   fault information notice means of notifying fault information to the other ring nodes R1 in the same two-media ring network if a fault occurs at an adjacent one of the ring nodes R2;
   send-back transfer means of sending back the transferred NNI packet in transfer of the NNI packet; and
   NNI packet transmitting means of updating the TTL value on the basis of fault information from the other ring nodes R1 if said ring node R1 is a transmission source ring node R1, said NNI packet transmitting means transmitting the NNI packet from the same two-media ring network as before the occurrence of the fault to one of the ring nodes R2 other than the ring node R2 at which the fault has occurred.

6. A computer-readable medium encoded with a computer program for making a computer execute a method of controlling a multi-two-media ring network in which a plurality of two-media ring networks using ring nodes transfer a network node interface (NNI) packet by using an inner ring or an outer ring and transfer the NNI packet to a desired network or terminal are connected, said computer program causing the computer to execute:
   a TTL value updating step of updating a time to live (TTL) value in the NNI packet when the NNI packet is transferred from one of the two-media ring networks to another of the two-media ring networks; and
   an NNI packet processing step of comparing the updated TTL value and a predetermined TTL discard value and discarding the NNI packet or transferring the NNI packet to an adjacent ring node according to the result of comparison.

7. A computer-readable medium encoded with a computer program for making a computer execute a method of controlling a multi-two-media ring network in which a plurality of two-media ring networks using ring nodes transfer an NNI packet by using an inner ring or an outer ring and transfer the NNI packet to a desired network or terminal are connected, said computer program causing the computer to execute:
   a TTL value updating step of updating a TTL value in the NNI packet when the NNI packet is transferred from one of the two-media ring networks to another of the two-media ring networks;

a TTL discard value recomputation step of recomputing a TTL discard value on the basis of in-ring fault information in the transferred NNI packet in a case where a fault occurs in some of the ring nodes in the another of the two-media ring networks; and an NNI packet processing step of comparing the updated TTL value and the recomputed TTL discard value and discarding the NNI packet or transferring the NNI packet to an adjacent ring node according to the result of comparison.

8. A method of controlling a multi-two-media ring network in which a plurality of two-media ring networks are connected, each two-media ring network using ring nodes which transfer an NNI packet having a transmission source ring node address, a transmission destination ring node address, a TTL area, and a data storage area, the ring nodes being connected by a two-media ring formed by an inner ring and an outer ring having different NNI packet transfer directions, the ring nodes transferring the NNI packet by using the inner ring or the outer ring and transferring the NNI packet to a desired network or terminal, said method including a ring frame discard method in which, in a case where, when an NNI packet to be transmitted over a plurality of packet ring networks is input, one of the ring nodes bridging different two-media rings transfers the NNI packet to the two-media ring at the other bridge end, the ring node updates the TTL value in the NNI packet to a TTL initial value A of the transmission destination two-media ring, and transfers the NNI packet from the inner ring or the outer ring;

one of the ring nodes receiving the NNI packet subtracts 1 from the TTL value in the NNI packet and transfers the NNI packet to the same ring as the inner ring or the outer ring from which the NNI packet has been received, if the transmission destination ring node to which the NNI packet is directed is different from the receiving ring node, if the NNI packet does not need to be transferred to a different one of the two-media rings via the receiving ring node, or if the TTL value in the NNI packet is different from a predetermined TTL value M; and the receiving ring node removes the NNI packet from the inner ring or the outer ring if the transmission destination ring node to which the NNI packet is directed corresponds to the receiving ring node, if the NNI packet needs to be transferred to a different one of the two-media rings via the receiving ring node, or if the TTL value in the NNI packet is the same as the predetermined TTL value M.

9. The method according to claim 8, wherein the TTL initial value A to which the TTL value is updated is value common to the ring nodes connected to the transmission destination two-media ring.

10. The method according to claim 8, wherein the TTL discard value M is determined as a value which can be detected if a ring frame sent out by one of the ring nodes from the inner ring or the outer ring is received through the same inner ring or the outer ring as that from which the ring frame has been sent out.

11. The method according to claim 8, wherein each of the ring nodes grasps the fault condition on the two-media ring to which it belongs, and sets the TTL discard value M to a value obtained by subtracting the number n of ring nodes on the two-media ring from the TTL initial value A or to a value obtained by subtracting the number n of ring nodes on the two-media ring from the TTL initial value A and adding 1 to the result of this subtraction in a situation where no fault occurs, and wherein when a fault occurs, the ring node computes the number of hops h1 and h2 to the ring nodes adjacent to the fault point on the opposite sides of the same, and sets the TTL discard value M to a value obtained by subtracting a value twice the sum (h1+h2) of the computed numbers of hops from the TTL initial value A or to a value obtained by subtracting the value twice the sum (h1+h2) of the computed numbers of hops from the TTL initial value A and adding 1 to the result of this subtraction.

12. A ring node in a multi-two-media ring network in which a plurality of two-media ring networks are connected, each two-media ring network being constituted by ring nodes which transfer an NNI packet having a transmission source ring node address, a transmission destination ring node address, a TTL area, and a data storage area, or an NNI packet having a packet attribute area and a flow ID area in addition to said NNI packet configuration, the ring nodes being connected by a two-media ring formed by an inner ring and an outer ring having different NNI packet transfer directions, the ring nodes transferring the NNI packet by using the inner ring or the outer ring and transferring the NNI packet to a desired network or terminal, said ring node comprising:

a TTL comparator which refers to the TTL area of the NNI packet input from the inner ring or the outer ring and discards the NNI packet if the value in the TTL area is equal to a set TTL discard value M;

a pass/drop determination circuit which subtracts 1 from the TTL value in an NNI packet transferred from said TTL comparator, having a transmission destination ring node address or a flow ID designating said ring node or a group of ring nodes including said ring node, and having as a packet attribute an identifier for in-ring fault information notice, an NNI packet having as a packet attribute an identifier for data and having as a transmission destination ring node address an address indicating a need for inter-ring bridging or an NNI packet having as a flow ID an identifier indicating a need for inter-ring bridging, and an NNI packet having as a packet attribute an identifier for data and having as a transmission destination ring node address an address indicating a need for inhibiting inter-ring bridging or an NNI packet having as a flow ID an identifier indicating a need for inhibiting inter-ring bridging, which outputs each of the NNI packets having values, other than 0 as the results of subtraction of the TTL value respectively to a suitable port, and which discards an NNI packet if the result of subtraction of the TTL value is 0;

a protection switch which allows the NNI packet transferred from said pass/drop determination circuit, having as a packet attribute an identifier for data and having as a transmission destination ring node address an address indicating a need for inhibiting inter-ring bridging or the NNI packet having as a flow ID an identifier indicating a need for inhibiting inter-ring bridging to pass therethrough in a pass mode, and which sends back the NNI packet in a lap mode;

a ring bridge which outputs to a suitable port the NNI packet transferred from said pass/drop determination circuit, having as a packet attribute an identifier for data and having as a transmission destination ring node address an address indicating a need for inter-ring bridging or the NNI packet having as a flow ID an identifier indicating a need for inter-ring bridging;

a TTL setting circuit which updates the TTL value in the NNI packet transferred from said ring switch;

a ring protection processing/topology management circuit which notifies said TTL setting circuit of a TTL initial value A, which computes the TTL discard value M on the basis of the number n of ring nodes existing in the two-media ring if the in-ring fault information notice in the NNI packet transferred from the pass/drop determination circuit, having a transmission destination ring node address or a flow ID designating said ring node or a group of ring nodes including said ring node, and having as a packet attribute an identifier for in-ring fault information notice does not indicate occurrence of any fault, or on the basis of the number of hops h1 on the inner ring and the number of hops h2 on the outer ring to the fault detecting ring node if the in-ring fault information notice indicates occurrence of a fault, which informs the TTL comparator of the computed TTL discard value M, and which changes the mode of said protection switch to the lap mode and forms an NNI packet having an in-ring fault information including the address of said node if a fault occurs at a junction link in said ring node; and a multiplexing circuit which multiplexes the NNI packets from said TTL setting circuit, said protection switch, and said ring protection processing/topology management circuit, and transfers the multiplexed packets to the inner ring or the outer ring.

13. The ring node according to claim 12, wherein the TTL discard value M notified to said TTL comparator by said ring protection processing/topology management circuit is a TTL value which can be detected by said ring node if the NNI packet sent out from said ring node from the inner ring or the outer ring with the TTL initial value A is received by the same inner ring or the outer ring as that from which the NNI packet has been sent out.

14. The ring node according to claim 12, wherein said ring protection processing/topology management circuit notifies said TTL comparator of the .TTL discard value M set to a value obtained by subtracting 1 from the number n of ring nodes on the two-media ring to which said node belongs, if it is not notified of occurrence of any fault in the two-media ring through the in-ring fault information notice from said pass/drop determination circuit, and if no fault occurs at the junction links in said node.

15. The ring node according to claim 12, wherein said ring protection processing/topology management circuit sets the TTL discard value M to a value obtained by subtracting a value twice the sum of the numbers of hops h1 and h2 to the fault detecting ring node from the TTL initial value A and adding 1 to the result of this subtraction, if it is notified of occurrence of a fault in the two-media ring through the in-ring fault information notice from said pass/drop determination circuit, or if a fault occurs at the junction links in said node.

16. The ring node according to claim 12, wherein if said ring protection processing/topology management circuit receives fault information notice from only one of said pass/drop determination circuits provided in the inner and outer rings while being notified of occurrence of a fault in the two-media ring through the in-ring fault information notice from said pass/drop determination circuit, or when a fault occurs at the junction links in said node, said ring protection processing/topology management circuit computes by assuming that a value obtained by subtracting the number n of ring nodes on the two-media ring or the number of hops h1 or h2 to the fault detecting node notified by the fault information notice and further subtracting 1 is the number of hops h2 or h1 to the fault detection ring node notified from the other of the pass/drop detection circuits.

17. The ring node according to claim 12, wherein the TTL initial value A set by said ring protection processing/topology management circuit is such that the TTL value detected at said ring node is −1 or greater when an NNI packet is received from the inner ring or the outer ring on the two-media ring after the NNI packet has been sent to the same ring in a situation where a single link fault occurs on the two-media ring to which said ring node belongs.

18. The ring node according to claim 12, wherein the TTL initial value A set by said ring protection processing/topology management circuit is equal to or greater than 2n−3 if the number of ring nodes on the two-media rings to which said ring node belongs is n.

19. A method of controlling a multi-two-media ring network in which a plurality of two-media ring networks are connected by a ring node R2 for inter-ring bridging, each two-media ring network being constituted by ring nodes R1 which transfer an NNI packet having a transmission source ring node address, a transmission destination ring node address, a TTL area, and a data storage area, or an NNI packet having a packet attribute area, a flow ID area and a transmission ring ID in addition to said NNI packet configuration, the ring nodes R1 being connected by a two-media ring formed by an inner ring and an outer ring having different NNI packet transfer directions, the ring nodes R1 transmitting and receiving the NNI packet by using the inner ring or the outer ring and performing transmitting and receiving of the NNI packet with a terminal through a tributary port, said method comprising:

forming an inter-ring protection domain by arranging the ring node R2 and a plurality of other ring nodes R2 in an annular configuration, and measuring or previously setting the number of hops to each of the adjacent ring nodes R2 in the same inter-ring protection domain; and effecting protection from a fault at any of the inter-ring bridging ring nodes by performing processing including:

if one of the ring nodes R2 becomes faulty, causing an NNI packet, which is about to be transferred to the faulty ring node R2 via the inner ring, to be transferred to the outer ring by means of the adjacent ring node R1 or R2 on the two-media ring containing the faulty ring node R2, causing an NNI packet, which is about to be transferred to the faulty ring node R2 via the outer ring, to be transferred to the inner ring by means of the ring node R1 or R2, and, when some of the ring nodes R1 and R2 on the same two-media ring as that having the faulty ring node R2 cause NNI packets to flow into the two-media ring, storing a value which is the sum of an initial value A, the number of hops h to the faulty ring node R2 and a fixed value i as TTL in the NNI packet to be transferred from the faulty ring node R2 to another of the two-media rings, storing the initial value A as TTL in the NNI packet not to be transferred from the faulty ring node R2 to any of the other two-media rings, and transferring each of the NNI packets to the same ring as before the occurrence of the fault;

when one of the ring nodes R2 belonging to the same inter-ring protection domain receives an NNI packet, comparing the transmission ring ID and the TTL value in the NNI packet with the ID of the receiving ring and the TTL extract value X, respectively, taking in the NNI packet if the result of comparison meets a certain extraction condition, setting the TTL initial value A common in the two-media ring at the other bridge end as TTL in the NNI packet if the faulty ring node R2 belongs to the two-media ring at the other bridge end, and transferring the NNI packet; and setting a value obtained by adding the number of hops BD to the adjacent ring node R2 in the same inter-ring protection domain and a fixed value k to the TTL initial value A common in the two-media ring at the other bridge end as TTL in the NNI packet if the faulty ring node R2 does not belong to the two-media ring at the other bridge end, and transferring the NNI packet.

20. The method according to claim 19, wherein if the ring node R2 belongs to the same inter-ring protection domain as the faulty ring node R2 belongs, is an adjacent ring node, and is an adjacent ring node R2 on the same two-media ring as that on which the faulty ring node R2 exists, and if the two-media ring has the common TTL initial value A and the fixed value i, and the total number of ring nodes R1 and R2 on the two-media ring is n, said extraction condition is that the transmission ring ID in the received NNI packet and the ID of the receiving ring coincide with each other and the TTL value in the NNI packet satisfies TTL extract value X=(A+i+2), or that the transmission ring ID in the received NNI packet and the ID of the receiving ring are different from each other and the TTL value in the NNI packet satisfies TTL extract value X=(A+i−n−4).

21. The method according to claim 19, wherein if the ring node R2 belongs to the same inter-ring protection domain as the faulty ring node R2 belongs, is an adjacent ring node, and exists on the same two-media ring as the faulty ring node R2 does, but is not adjacent to the faulty ring node R2, said extraction condition is that the transmission ring ID in the received NNI packet and the ID of the receiving ring coincide with each other and the TTL value in the NNI packet satisfies TTL extract value X=(A+i+BD+1).

22. The method according to claim 19, wherein if the ring node R2 belongs to the same inter-ring protection domain as the faulty ring node R2 belongs, is an adjacent ring node, and exists on the same two-media ring as the faulty ring node R2 does, but is not adjacent to the faulty ring node R2, said extraction condition is that the transmission ring ID in the received NNI packet and the ID of the receiving ring are different from each other and the TTL value in the NNI packet satisfies TTL extract value X=(A+i+1)−(n−BD+2), or that the transmission ring ID in the received NNI packet and the ID of the receiving ring are different from each other and the TTL value in the NNI packet satisfies TTL extract value X=(A+i+1)−(BD−2).

23. The method according to claim 19, wherein if the ring node R2 belongs to the same inter-ring protection domain as the faulty ring node R2 belongs, is an adjacent ring node, and exists on the same two-media ring as the faulty ring node R2 does, but is not adjacent to the faulty ring node R2, said extraction condition is that the transmission ring ID in the received NNI packet and the ID of the receiving ring coincide with each other and the TTL value in the NNI packet satisfies TTL extract value X=(A+i+1)−(n+BD−4), or that the transmission ring ID in the received NNI packet and the ID of the receiving ring are different from each other and the TTL value in the NNI packet satisfies TTL extract value X=(A+i+1)−(2*n−BD−4).

24. The method according to claim 19, wherein the ring node R1 or R2 computes the number of hops h from the TTL value in the received NNI packet and the TTL initial value A of the two-media ring predetermined with respect to the receiving point;

stores the flow ID, the transmission source ring node address, or the combination of the flow ID and the transmission source ring node address in the NNI packet, and the number of hops h; and estimates the number of hops h with respect to an NNI packet having a match to said flow ID, an NNI packet having a transmission destination ring node address coinciding with the transmission source ring node address, or an NNI packet having a matching flow ID and a transmission destination ring node address coinciding with the transmission source ring node address.

25. The method according to claim 19, wherein if a fault occurs at one of the adjacent ring nodes R2 belonging to the same inter-ring protection domain, a fault notice is sent to the ring nodes R2 belonging to the same inter-ring protection domain.

26. The method according to claim 19, wherein the ring nodes R2 belonging to the same inter-ring protection domain exchange a keep alive signal with each other, and a fault at one transmission source ring node R2 is recognized if the keep alive signal is not received therefrom during a predetermined time period.

27. The method according to claim 19, wherein the ring nodes R2 belonging to the same inter-ring protection domain exchange a keep alive signal with each other, and a fault at one transmission source ring node R2 is recognized if the keep alive signal is not received therefrom during a predetermined time period;

a fault notice is sent to the ring nodes R2 belonging to the same inter-ring protection domain; and the ring node recognizing the fault and the ring node receiving the fault notice set the TTL extract value X.

28. A ring node R1 in a multi-two-media ring network in which a plurality of two-media ring networks are connected by ring nodes R2 for inter-ring bridging, each two-media ring network being constituted by said ring node R1 and other ring nodes R1 which transfer an NNI packet having a transmission source ring node address, a transmission destination ring node address, a TTL area, and a data storage area, or an NNI packet having a packet attribute area, a flow ID area and a transmission ring ID in addition to said NNI packet configuration, the ring nodes being connected by a two-media ring formed by an inner ring and an outer ring having different NNI packet transfer directions, the ring nodes transmitting and receiving the NNI packet by using the inner ring or the outer ring and performing transmitting and receiving of UNI packets with a terminal through a tributary port, said ring node R1 comprising:

an address comparator which discards an NNI packet transferred from the inner ring or the outer ring, having a transmission source ring node address coinciding with the address of said ring node, and having a transmission ring ID coinciding with the receiving ring;

a forwarding circuit which outputs to a suitable port an NNI packet transferred from said address comparator and meeting a condition 1 having a packet attribute indicating fault information notice, an NNI packet meeting a condition 2 having a packet attribute indicating data and a transmission destination ring node address coinciding only with the address of said ring node, and an NNI packet meeting a condition 3 having a packet attribute indicating data and a transmission destination ring node address indicating a plurality of ring node addresses including the address of said ring node, which discards an NNI packet not meeting said condition 1, an NNI packet not meeting said condition 2, and an NNI packet having a TTL value equal to 0 as result of subtraction of 1 from the TTL value of an NNI packet copied from an NNI packet meeting said condition 3, and which outputs NNI packets with TTL values other than 0 to a suitable port;

a frame conversion circuit which converts an input UNI packet into an NNI packet and outputs the NNI packet to a transmission destination ring node, and which converts an input NNI packet into a UNI packet and outputs the UNI packet;

a TTL setting circuit which is supplied with an NNI packet transmitted from said frame conversion circuit and updates the TTL values in the NNI packet to designated values according to a designated flow ID and a transmission destination ring node address;

a packet switch which transfers NNI packets supplied from said forwarding circuit and said TTL setting circuit to said frame conversion circuit or suitable ports as required;

a protection switch which allows an NNI packet not meeting the conditions 1 and 2 but meeting the condition 3, transferred from said forwarding circuit by being copied, and having a TTL value other than 0 to pass therethrough in a pass mode, and sends it back in a lap mode;

a ring node protection circuit which receives an NNI packet meeting the condition 1 from said forwarding circuit, which changes the mode of said protection switch to the lap mode if a fault occurs at a junction link of said ring node, forms an NNI packet containing fault information indicating that the said ring node is a fault detecting ring node, and transfers the NNI packet to a suitable output port, and which transfers a received NNI packet to a suitable output port and notifies fault detecting ring node information if fault information is contained in the received NNI packet;

a multiplexing circuit which multiplexes NNI packets transferred from said packet switch, said protection switch and said ring node protection circuit, and transfers the multiplexed packets to the inner ring or the outer ring; and a TTL management circuit which locates a fault point from fault detecting ring node information notified from said ring node protection circuit, grasps the number of hops h to a faulty ring node which may exist as a ring node effecting inter-ring bridging at the fault point, and notifies said TTL updating circuit that the TTL value in an NNI packet transferred to one of the other two-media rings via the faulty ring node is set to a value obtained by adding the number of hops h to the TTL initial value A, and that the TTL value of an NNI packet not transferred to the two-media ring via the faulty ring node is set to the initial value A.

29. A ring node R1 in a multi-two-media ring network described in claim 28, comprising:

an address comparator which discards an NNI packet transferred from the inner ring or the outer ring, having a transmission source ring node address coinciding with the address of said ring node, and having a transmission ring ID coinciding with the receiving ring;

a forwarding circuit which outputs to a suitable port an NNI packet transferred from said address comparator and meeting a condition 1 having a packet attribute indicating fault information notice, an NNI packet meeting a condition 2 having a packet attribute indicating data and a transmission destination ring node address coinciding only with the address of said ring node, and an NNI packet meeting a condition 3 having a packet attribute indicating data and a transmission destination ring node address indicating a plurality of ring node addresses including the address of said ring node, which discards an NNI packet not meeting said condition 1, an NNI packet not meeting said condition 2, and an NNI packet having a TTL value equal to 0 as result of subtraction of 1 from the TTL value of an NNI packet copied from an NNI packet meeting said condition 3, and which outputs NNI packets with TTL values other than 0 to a suitable port;

a frame conversion circuit which converts an input UNI packet into an NNI packet and outputs the NNI packet to a transmission destination ring node, and which converts an input NNI packet into a UNI packet and outputs the UNI packet;

a TTL setting circuit which is supplied with an NNI packet transmitted from said frame conversion circuit and updates the TTL values in the packet to designated values according to a designated flow ID and a transmission destination ring node address;

a packet switch which transfers NNI packets supplied from said hop counter and said TTL setting circuit to said frame conversion circuit or suitable ports as required;

a hop counter which refers to the TTL value in an NNI packet transferred from said forwarding circuit meeting the conditions 1 to 3, and computes the number of hops h1 of the NNI packet in the two-media ring from the difference from the TTL initial value determined in the two-media ring in advance;

a protection switch which allows an NNI packet transferred from said forwarding circuit and not meeting the conditions 1 and 2, and an NNI packet meeting the condition 3, copied, and having a TTL value other than 0 to pass therethrough in a pass mode, and sends them back in a lap mode;

a ring node protection circuit which receives an NNI packet meeting the condition 1 from said forwarding circuit, which changes the mode of said protection switch to the lap mode if a fault occurs at a junction link of said ring node, forms an NNI packet containing fault information indicating that the said ring node is a fault detecting ring node, and transfers the NNI packet to a suitable output port, and which transfers a received NNI packet to a suitable output port and notifies fault detecting ring node information if fault information is contained in the received NNI packet;

a multiplexing circuit which multiplexes NNI packets transferred from said packet switch, said protection switch and said ring node protection circuit, and transfers the multiplexed packets to the inner ring or the outer ring; and a TTL management circuit which locates a fault point from fault detecting ring node information notified from said ring node protection circuit, grasps the number of hops h to a faulty node which may exist as a ring node effecting inter-ring bridging at the fault point, identifies, from the flow ID notified from said hop counter, or from the relationship between the transmission source ring node address and the number of hops h1 in the two-media ring, an NNI packet which is transferred to another of the two-media rings via the faulty ring node, and notifies said TTL updating circuit that the TTL value of the identified NNI packet is set to a value obtained by adding the number of hops h to the TTL initial value A, and that the TTL value of an NNI packet not transferred to the other two-media ring via the faulty ring node is set to the initial value A.

30. A ring node R2 in a multi-two-media ring network in which a plurality of two-media ring networks are connected by said ring node R2 and other ring nodes R2 for inter-ring bridging, each two-media ring network being constituted by ring nodes R1 which transfer an NNI packet having a transmission source ring node address, a transmission destination ring node address, a TTL area, and a data storage area, or an NNI packet having a packet attribute area, a flow ID area and a transmission ring ID in addition to said NNI packet configuration, the ring nodes being connected by a two-media ring formed by an inner ring and an outer ring having different NNI packet transfer directions, the ring nodes transmitting and receiving the NNI packet by using the inner ring or the outer ring and performing transmitting and receiving of UNI packets with a terminal through a tributary port, said ring node R2 comprising:

an NNI packet input via the inner ring or the outer ring, having a packet transmission destination ring node address or a flow ID, or both the packet transmission destination ring node address and the flow ID, and a packet attribute indicating in-ring fault information notice, an NNI packet having a packet attribute indicating data and to be transferred to different two-media rings, and an NNI packet in which the relationship between a transmission ring ID and a receiving ring and the relationship between a TTL value and a TTL extract value X satisfy a certain condition;

a bridge determination circuit which separates NNI packets which are to be transferred to the same two-media ring and which have a TTL value from which a value other than 0 is obtained by subtraction of 1, which transfers each NNI packet to a suitable output port, and which discards NNI packets among those to be transferred to the same two-media ring if the result of TTL subtraction is 0;

a protection switch which allows an NNI packet processed by subtraction processing and transferred from said bridge determination circuit to pass therethrough in a pass mode, and which sends it back in a lap mode;

a ring node protection circuit which receives an NNI packet transferred from said bridge determination circuit and having a packet attribute indicating in-ring fault information notice, which grasps fault information about the two-media ring to which said ring node belongs, which changes the mode of said protection switch to the lap mode if a fault occurs in a junction link of said ring node, and which holds fault detecting ring node information in a fault information notice in the case of a fault other than that at the junction link of said ring node, forms an in-ring fault information NNI packet, and transfers this packet to a suitable output port;

a ring bridge which transfers to a suitable output port an NNI packet transferred from said bridge determination circuit, having as a packet attribute indicating data and to be transferred to different two-media rings, and an NNI packet in which the relationship between the transmission ring ID and the receiving ring and the relationship between the TTL value and the TTL extract value X satisfy a certain condition;

a TTL updating circuit which updates the TTL value in the NNI packet transferred from said ring bridge in a unit corresponding to a packet flow ID, a transmission destination ring node address, or a combination of a flow ID, a transmission destination ring node address and a transmission source ring node address;

a multiplexing circuit which multiplexes NNI packets transferred from said protection switch, said ring node protection circuit, and said ring bridge, and transfers the multiplexed packets to the inner ring or the outer ring; and a TTL management circuit which locates a fault point by referring to fault detecting ring node information notified from said ring node protection circuit, grasps the number of hops h to a faulty ring node which may exist as a ring node effecting inter-ring bridging at the fault point, and identifies an NNI packet transferred to the other two-media ring via the faulty ring node;

which notifies said TTL updating circuit that the TTL value in the identified NNI packet is set to a TTL value Y, the TTL value in an NNI packet not transferred to the other two-media ring via the faulty ring node is set to the initial value A, and the TTL value in the NNI packet in which the relationship between the transmission ring ID and the receiving ring and the relationship between the TTL value and the TTL extract value X satisfy a certain condition, and which is transferred to said ring bridge is set to a TTL value Z; and which notifies said bridge determination circuit of the TTL extract value X.

31. A ring node R2 in a multi-two-media ring network in which a plurality of two-media ring networks are connected by said ring node R2 and other ring nodes R2 for inter-ring bridging, each two-media ring network being constituted by ring nodes R1 which transfer an NNI packet having a transmission source ring node address, a transmission destination ring node address, a TTL area, and a data storage area, or an NNI packet having a packet attribute area, a flow ID area and a transmission ring ID in addition to said NNI packet configuration, the ring nodes being connected by a two-media ring formed by an inner ring and an outer ring having different NNI packet transfer directions, the ring nodes transmitting and receiving the NNI packet by using the inner ring or the outer ring and performing transmitting and receiving of UNI packets with a terminal through a tributary port, said ring node R2 comprising:

an NNI packet input via the inner ring or the outer ring, having a packet transmission destination ring node address or a flow ID, or both the packet transmission destination ring node address and the flow ID, and a packet attribute indicating in-ring fault information notice, an NNI packet having a packet attribute indicating data and to be transferred to different two-media rings, and an NNI packet in which the relationship between a transmission ring ID and a receiving ring and the relationship between a TTL value and a TTL extract value X satisfy a certain condition;

a bridge determination circuit which separates NNI packets which are to be transferred to the same two-media ring and which have a TTL value from which a value other than 0 is obtained by subtraction of 1, which transfers each NNI packet to a suitable output port, and which discards NNI packets among those to be transferred to the same two-media ring if the result of TTL subtraction is 0;

a protection switch which allows an NNI packet processed by subtraction processing and transferred from said bridge determination circuit to pass therethrough in a pass mode, and which sends it back in a lap mode;

a ring node protection circuit which receives an NNI packet transferred from said bridge determination circuit and having a packet attribute indicating in-ring fault information notice, which grasps fault information about the two-media ring to which said ring node belongs, which changes the mode of said protection switch to the lap mode if a fault occurs in a junction link of said ring node, and which holds fault detecting ring node information in a fault information notice in the case of a fault other than that at the junction link of said ring node, forms an in-ring fault information NNI packet, and transfers this packet to a suitable output port;

a hop counter which receives an NNI packet transferred from said bridge determination circuit, having as a packet attribute indicating data and to be transferred to different two-media rings, and an NNI packet in which/ the relationship between the transmission ring ID and the receiving ring and the relationship between the TTL value and the TTL extract value X satisfy a certain condition, and which computes the number of hops h1 of the NNI packet in the two-media ring from the difference from the TTL initial value A determined in advance in the two-media ring;

a ring bridge which transfers an NNI packet from the hop counter to a suitable output port;

a TTL updating circuit which updates the TTL value in the NNI packet transferred from said ring bridge in a unit corresponding to a packet flow ID, a transmission destination ring node address, or a combination of a flow ID, a transmission destination ring node address and a transmission source ring node address;

a multiplexing circuit which multiplexes NNI packets transferred from said protection switch, said ring node protection circuit, and said ring bridge, and transfers the multiplexed packets to the inner ring or the outer ring; and a TTL management circuit which locates a fault point by referring to fault detecting ring node information notified from said ring node protection circuit, grasps the number of hops h to a faulty ring node which may exist as a ring node effecting inter-ring bridging at the fault point, and identifies an NNI packet transferred to the other two-media ring via the faulty ring node from the relationship between the flow ID notified from said hop counter or transmission source ring node address and the number of hops h1 in the two-media ring notified from said hop counter;

which notifies said TTL updating circuit that the TTL value in the identified NNI packet is set to a TTL value Y, the TTL value in an NNI packet not transferred to the other two-media ring via the faulty ring node is set to the initial value A, the TTL value in the NNI packet is set to Z1 if the NNI packet is transferred to said ring bridge while the relationship between the transmission ring ID and the receiving ring and the relationship between the TTL value and the TTL extract value X satisfy a certain condition, and if the faulty ring node R2 does not exist on the two-media ring at the other bridge end, and the TTL value in the NNI packet is set to Z2 if the faulty ring node R2 exists on the two-media ring at the other bridge end; and which notifies said bridge determination circuit of the TTL extract value X.

32. A ring node R2 in a multi-two-media ring network in which a plurality of two-media ring networks are connected by said ring node R2 and other ring nodes R2 for inter-ring bridging, each two-media ring network being constituted by ring nodes R1 which transfer an NNI packet having a transmission source ring node address, a transmission destination ring node address, a TTL area, and a data storage area, or an NNI packet having a packet attribute area, a flow ID area and a transmission ring ID in addition to said NNI packet configuration, the ring nodes being connected by a two-media ring formed by an inner ring and an outer ring having different NNI packet transfer directions, the ring nodes transmitting and receiving the NNI packet by using the inner ring or the outer ring and performing transmitting and receiving of UNI packets with a terminal through a tributary port, said ring node R2 comprising:

an NNI packet input via the inner ring or the outer ring, having a packet transmission destination ring node address or a flow ID, or both the packet transmission destination ring node address and the flow ID, and a packet attribute indicating in-ring fault information notice, an NNI packet having a packet attribute indicating inter-ring fault information notice, an NNI packet having a packet attribute indicating data and to be transferred to different two-media rings, and an NNI packet in which the relationship between a transmission ring ID and a receiving ring and the relationship between a TTL value and a TTL extract value X satisfy a certain condition;

a bridge determination circuit which separates NNI packets which are to be transferred to the same two-media ring and which have a TTL value from which a value other than 0 is obtained by subtraction of 1, which transfers each NNI packet to a suitable output port, and which discards NNI packets among those to be transferred to the same two-media ring if the result of TTL subtraction is 0;

a protection switch which allows an NNI packet processed by subtraction processing and transferred from said bridge determination circuit to pass therethrough in a pass mode, and which sends it back in a lap mode;

a ring node protection circuit which receives an NNI packet transferred from said bridge determination circuit and having a packet attribute indicating in-ring fault information notice, which grasps fault information about the two-media ring to which said ring node belongs, which changes the mode of said protection switch to the lap mode if a fault occurs in a junction link of said ring node, and which holds fault detecting ring node information in a fault information notice in the case of a fault other than that at the junction link of said ring node, forms an in-ring fault information NNI packet, and transfers this packet to a suitable output port;

a ring bridge which transfers to a suitable output port an NNI packet transferred from said bridge determination circuit, and having as a packet attribute indicating inter-ring fault information notice, and NNI packet having a packet attribute indicating data and to be transferred to different two-media rings, and an NNI packet in which the relationship between the transmission ring ID and the receiving ring and the relationship between the TTL value and the TTL extract value X satisfy a certain condition;

an inter-ring protection circuit which receives an NNI packet transferred from said ring bridge, and having as a packet attribute indicating inter-ring fault information notice, and which, in the event of detection of fault information or a fault at one of the adjacent ring nodes R2 on the same ring protection domain notified through inter-ring fault information, notifies some of the adjacent ring nodes R2 on the same ring protection domain;

a TTL updating circuit which updates the TTL value in the NNI packet transferred from said ring bridge in a unit corresponding to a packet flow ID, a transmission destination ring node address, or a combination of a flow ID, a transmission destination ring node address and a transmission source ring node address;

a multiplexing circuit which multiplexes NNI packets transferred from said protection switch, said ring node protection circuit, and said ring bridge, and transfers the multiplexed packets to the inner ring or the outer ring; and a TTL management circuit which locates a fault point by referring to fault detecting node information notified from said ring node protection circuit, grasps the number of hops h to a faulty node which may exist as a ring node effecting inter-ring bridging at the fault point, and identifies an NNI packet transferred to the other two-media ring via the faulty ring node from the relationship between the flow ID notified from said hop counter or transmission source ring node address and the number of hops h1 in the two-media ring notified from said hop counter;

which notifies said TTL updating circuit that the TTL value in the identified NNI packet is set to a TTL value Y, the TTL value in an NNI packet not transferred to the other two-media ring via the faulty ring node is set to the initial value A, the TTL value in the NNI packet is set to Z1 if the NNI packet is transferred to said ring bridge while the relationship between the transmission ring ID and the receiving ring and the relationship between the TTL value and the TTL extract value X satisfy a certain condition, and if the faulty ring node R2 does not exist on the two-media ring at the other bridge end, and the TTL value in the NNI packet is set to Z2 if the faulty ring node R2 exists on the two-media ring at the other bridge end; and which notifies said bridge determination circuit of the TTL extract value X.

33. A ring node R2 in a multi-two-media ring network in which a plurality of two-media ring networks are connected by said ring node R2 and other ring nodes R2 for inter-ring bridging, each two-media ring network being constituted by ring nodes R1 which transfer an NNI packet having a transmission source ring node address, a transmission destination ring node address, a TTL area, and a data storage area, or an NNI packet having a packet attribute area, a flow ID area and a transmission ring ID in addition to said NNI packet configuration, the ring nodes being connected by a two-media ring formed by an inner ring and an outer ring having different NNI packet transfer directions, the ring nodes transmitting and receiving the NNI packet by using the inner ring or the outer ring and performing transmitting and receiving of UNI packets with a terminal through a tributary port, said ring node R2 comprising:

an NNI packet input via the inner ring or the outer ring, having a packet transmission destination ring node address or a flow ID, or both the packet transmission destination ring node address and the flow ID, and a packet attribute indicating in-rind fault information notice, an NNI packet having a packet attribute indicating inter-ring fault information notice, an NNI packet having a packet attribute indicating data and to be transferred to different two-media rings, and an NNI packet in which the relationship between a transmission ring ID and a receiving ring and the relationship between a TTL value and a TTL extract value X satisfy a certain condition;

a bridge determination circuit which separates NNI packets which are to be transferred to the same two-media ring and which have a TTL value from which a value other than 0 is obtained by subtraction of 1, which transfers each NNI packet to a suitable output port, and which discards NNI packets among those to be transferred to the same two-media ring if the result of TTL subtraction is 0;

a protection switch which allows an NNI packet processed by subtraction processing and transferred from said bridge determination circuit to pass therethrough in a pass mode, and which sends it back in a lap mode;

a ring node protection circuit which receives an NNI packet transferred from said bridge determination circuit and having a packet attribute indicating in-ring fault information notice, which grasps fault information about the two-media ring to which said ring node belongs, which changes the mode of said protection switch to the lap mode if a fault occurs in a junction link of said ring node, and which holds fault detecting ring node information in a fault information notice in the case of a fault other than that at the junction link of said ring node, forms an in-ring fault information NNI packet, and transfers this packet to a suitable output port;

a hop counter which receives an NNI packet transferred from said bridge determination circuit, having as a packet attribute indicating data and to be transferred to different two-media rings, and an NNI packet in which the relationship between the transmission ring ID and the receiving ring and the relationship between the TTL value and the TTL extract value X satisfy a certain condition, and which computes the number of hops h1 of the NNI packet in the two-media ring from the difference from the TTL initial value A determined in advance in the two-media ring;

a ring bridge which transfers to a suitable output port an NNI packet transferred from said hop counter;

an inter-ring protection circuit which receives an NNI packet transferred from said ring bridge, and having as a packet attribute indicating inter-ring fault information notice, and which, in the event of detection of fault information or a fault at one of the adjacent ring nodes R2 on the same ring protection domain notified through inter-ring fault information, notifies some of the adjacent ring nodes R2 on the same ring protection domain;

a TTL updating circuit which updates the TTL value in the NNI packet transferred from said ring bridge in a unit corresponding to a packet flow ID, a transmission destination ring node address, or a combination of a flow ID, a transmission destination ring node address and a transmission source ring node address;

a multiplexing circuit which multiplexes NNI packets transferred from said protection switch, said ring node protection circuit, and said ring bridge, and transfers the multiplexed packets to the inner ring or the outer ring; and a TTL management circuit which locates a fault point by referring to fault detecting ring node information notified from said ring node protection circuit, grasps the number of hops h to a faulty ring node which may exist as a ring node effecting inter-ring bridging at the fault point, and identifies an NNI packet transferred to the other two-media ring via the faulty ring node from the relationship between the flow ID notified from said hop counter or transmission source ring node address and the number of hops h1 in the two-media ring notified from said hop counter;

which notifies said TTL updating circuit that the TTL value in the identified NNI packet is set to a TTL value Y, the TTL value in an NNI packet not transferred to the other two-media ring via the faulty ring node is set to the initial value A, the TTL value in the NNI packet is set to Z1 if the NNI packet is transferred to said ring bridge while the relationship between the transmission ring ID and the receiving ring and the relationship between the TTL value and the TTL extract value X satisfy a certain condition, and if the faulty ring node R2 does not exist on the two-media ring at the other bridge end, and the TTL value in the NNI packet is set to Z2 if the faulty ring node R2 exists on the two-media ring at the other bridge end; and which notifies said bridge determination circuit of the TTL extract value X.

34. The ring node R2 according to claim 30, wherein said TTL value Y is a value obtained by adding the number of hops h to the faulty ring node R2 and a fixed value i to the TTL initial value A predetermined in the transfer destination two-media ring.

35. The ring node R2 according to claim 30, wherein said TTL value Z1 is a value obtained by adding the number of hops BD to the transfer destination adjacent ring node R2 in the same inter-ring protection domain and a fixed value k to the TTL initial value A characteristic of the two-media ring at the other bridge end.

36. The ring node R2 according to claim 30, wherein said TTL value Z2 is the same as the initial value A characteristic of the two-media ring at the other bridge end.

37. The ring node R2 according to claim 30, wherein if the ring node R2 belongs to the same inter-ring protection domain as the faulty ring node R2 belongs, is an adjacent ring node, and is an adjacent ring node R2 on the same two-media ring as that on which the faulty ring node R2 exists, and if the two-media ring has the common TTL initial value A and the fixed value i, and the total number of ring nodes R1 and R2 on the two-media ring is n, said extraction condition is that the transmission ring ID in the received NNI packet and the ID of the receiving ring coincide with each other and the TTL value in the NNI packet satisfies TTL extract value $X=(A+i+2)$, or that the transmission ring ID in the received NNI packet and the ID of the receiving ring are different from each other and the TTL value in the NNI packet satisfies TTL extract value $X=(A+i-n-4)$.

38. The ring node R2 according to claim 30, wherein if the ring node R2 belongs to the same inter-ring protection domain as the faulty ring node R2 belongs, is an adjacent ring node, and exists on the same two-media ring as the faulty ring node R2 does, but is not adjacent to the faulty ring node R2, said extraction condition is that the transmission ring ID in the received NNI packet and the ID of the receiving ring coincide with each other and the TTL value in the NNI packet satisfies TTL extract value $X=(A+i+BD+1)$.

39. The ring node R2 according to claim 30, wherein if the ring node R2 belongs to the same inter-ring protection domain as the faulty ring node R2 belongs, is a ring node adjacent to the faulty ring node R2, and exists on the same two-media ring as the faulty ring node R2 does, but is apart from the faulty ring node R2, said extraction condition is that the transmission ring ID in the received NNI packet and the ID of the receiving ring are different from each other and the TTL value in the NNI packet satisfies TTL extract value $X=(A+i+1)-(n-BD+2)$, or that the transmission ring ID in the received NNI packet and the ID of the receiving ring are different from each other and the TTL value in the NNI packet satisfies TTL extract value $X=(A+i+1)-(BD-2)$.

* * * * *